United States Patent
Baker

(10) Patent No.: US 8,369,499 B2
(45) Date of Patent: *Feb. 5, 2013

(54) METHODS AND SYSTEMS FOR PROVIDING ON-LINE BILLS FOR USE IN COMMUNICATION SERVICES

(75) Inventor: Nathan Baker, Tigard, OR (US)

(73) Assignee: Grape Technology Group, Inc., Bethlehem, PA (US)

(*) Notice: Subject to any disclaimer, the term of this patent is extended or adjusted under 35 U.S.C. 154(b) by 37 days.

This patent is subject to a terminal disclaimer.

(21) Appl. No.: 12/777,003

(22) Filed: May 10, 2010

(65) Prior Publication Data

US 2011/0116611 A1    May 19, 2011

Related U.S. Application Data

(63) Continuation of application No. 10/425,314, filed on Apr. 29, 2003, now Pat. No. 7,734,025, which is a continuation-in-part of application No. 10/376,935, filed on Feb. 28, 2003, now Pat. No. 6,985,569, which is a continuation-in-part of application No. 10/403,207, filed on Mar. 31, 2003.

(51) Int. Cl.
*H04M 15/00* (2006.01)

(52) U.S. Cl. .......... 379/114.01; 379/127.01; 379/127.03

(58) Field of Classification Search .............. 379/114.01, 379/114.03, 114.05, 114.28, 121.05, 121.06, 379/126, 127.01–127.05, 142.04, 218.01
See application file for complete search history.

(56) References Cited

U.S. PATENT DOCUMENTS

| | | | |
|---|---|---|---|
| 5,634,087 A | 5/1997 | Mammone et al. | |
| 5,797,092 A | 8/1998 | Cox et al. | |
| 5,839,103 A | 11/1998 | Mammone et al. | |
| 5,862,519 A | 1/1999 | Sharma et al. | |
| 5,966,437 A | 10/1999 | Cox et al. | |
| 5,982,864 A | 11/1999 | Jagadish et al. | |
| 6,038,528 A | 3/2000 | Mammone et al. | |
| 6,128,603 A | 10/2000 | Dent et al. | |
| 6,317,490 B1 | 11/2001 | Cameron et al. | |
| 6,445,775 B1 | 9/2002 | Morganstein et al. | |
| 6,480,825 B1 | 11/2002 | Sharma et al. | |
| 6,519,561 B1 | 2/2003 | Farrell et al. | |
| 6,594,352 B1 | 7/2003 | Smith | |
| 6,668,046 B1 | 12/2003 | Albal | |
| 6,870,921 B1 | 3/2005 | Elsey et al. | |
| 6,879,678 B1 | 4/2005 | Lang | |
| 6,937,711 B2 | 8/2005 | Baker | |
| 6,985,569 B2 | 1/2006 | Baker | |
| 7,734,025 B2 * | 6/2010 | Baker | 379/114.01 |
| 2001/0017915 A1 | 8/2001 | Wardin et al. | |
| 2002/0055351 A1 | 5/2002 | Elsey et al. | |
| 2002/0106070 A1 | 8/2002 | Elsey et al. | |
| 2003/0026405 A1 | 2/2003 | Elsey et al. | |
| 2003/0185375 A1 | 10/2003 | Albal | |

* cited by examiner

*Primary Examiner* — Quoc D Tran
(74) *Attorney, Agent, or Firm* — Sofer & Haroun, LLP

(57) ABSTRACT

A method is provided for operating a communications system that provides a service, where a plurality of parties may be associated with members of an account with the system to receive the service. The method includes receiving a call from one of a plurality of members of an account, the call including a request for a service, where a common bill is provided for services rendered to the members of the account. An identifier to be used to identify the one party from among the plurality of members is received from the one party among the plurality of members. The common bill is provided for services rendered to the plurality of members of the account to a communications device via a network. In the common bill an indicator is provided of the one party requesting the service in association with a respective entry for the requested service.

11 Claims, 13 Drawing Sheets

ABC Company

CURRENT CHARGES— Telephone Information Assistance Services

Account Number: IF-0000-0WL2
Statement Date: 02/05/2003

| Date | Time | To | Description | Duration | Charges |
|---|---|---|---|---|---|
| Mary White | | | | | |
| 06/06/2001 | 16:28:52 | (604) 738-8411 Robert Smith | TELUS OP ASSIST LOCAL DIRECTORY ASSIST | 42 | $0.24 |
| 06/11/2001 | 13:40:15 | (604) 590-3141 Frank Jones | TELUS OP ASSIST LOCAL DIRECTORY ASSIST | 42 | $0.24 |
| Arthur White | | | | | |
| 06/07/2001 | 13:06:54 | (818) 954-1173 Joe Williamson | REGULAR CALL | 108 | $0.45 |
| 06/11/2001 | 15:26:49 | (604) 731-8860 23 Legion Drive | TELUS OP ASSIST LOCAL DIRECTORY ASSIST | 54 | $0.31 |
| 06/12/2001 | 15:44:30 | (604) 280-6266 Sadie | TELUS OP ASSIST CONCIERGE ASSIST | 54 | $0.31 |
| | | | | Total Due | $1.55 |

[ Pay Bill ]

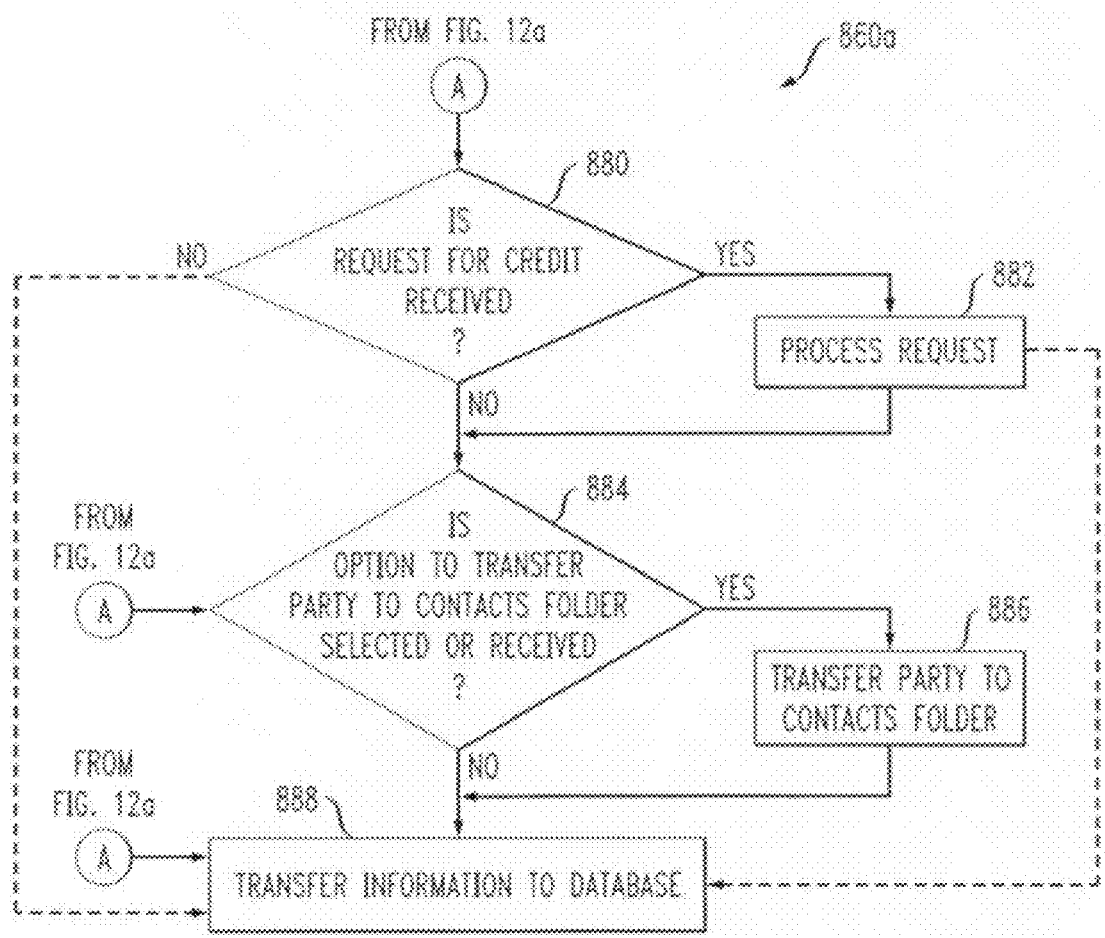

US 8,369,499 B2

METHODS AND SYSTEMS FOR PROVIDING ON-LINE BILLS FOR USE IN COMMUNICATION SERVICES

The present invention is a continuation of U.S. patent application Ser. No. 10/425,314, filed on Apr. 29, 2003, which in turn is a continuation-in-part of application Ser. No. 10/376,935, filed on Feb. 28, 2003, and application Ser. No. 10/403,207, filed on Mar. 31, 2003, all of which are incorporated by reference herein.

FIELD OF THE INVENTION

The invention relates to communications systems and method, and, more particularly, to methods and system for providing bills for communications services, on-line.

BACKGROUND OF THE INVENTION

It is a common experience to use a telephone or similar device, and other such communications devices, to call a telephone operator for information assistance. In a typical information assistance call, a caller (customer) identifies to the operator the name and address, or sometimes city or area code, of a party whose telephone number is desired. In response, the operator locates the desired destination number using a computer database, for example. The destination numbs may be provided to the customer by a computerized voice server, and the customer may be afforded the option of being connected to the destination number without the need to first terminate the information assistance call.

Even though a customer may subscribe to a telephone service provided by a particular carrier, such as AT&T Wireless Services Inc., or branding partner, such as Virgin, the information assistance service system accessed through the telephone service may be contracted by the carrier to different independent contractors. Therefore, when a subscriber to the carrier makes an information assistance call by dialing such typical access digits as "411," "*555," "555-1212," "00," "1-800-555-1212," etc., because of the contractual relationship, the carrier routes the information assistance call to its contracted information assistance service system to handle the information request.

Independent information assistance service providers may offer different information assistance services and service features in addition to directory assistance. For example, upon request, an operator may provide a user with information on regional restaurants, movie listings, directions to various places, etc., as well as the ability to purchase goods and services. The assignee of the present application is an information assistance service system which offers, among others, personalized services and special service features that are different than or lacking from other providers. For instance, one such service feature is a StarBack® service feature described in U.S. Pat. No. 5,797,092, whereby a caller, after being connected to a desired party, may be connected back to the information assistance service system by pressing a "*" key on their telephone, or otherwise issuing a command (saying the word "operator", for example). Examples of the assignee's personalized services include private directory assistance and foreign language directory assistance, which are described, for example, in U.S. Pat. No. 5,966,437 and International Publication No. WO 01/35621.

When a customer is connected to an information assistance system contracted by the customer's carrier, the customer is typically billed for information assistance services provided in the call and connection charges, through their carrier. These information assistance services include directory assistance and enhanced services, such as the aforementioned STARBACK® service. The connection charges include any applicable long distance and/or local toll charges (imposed by the carrier), any airtime charges (imposed by the carrier), and any other charges, such as paging and messaging charges, which are imposed or incurred when performing the information assistance service. Charges imposed by the information assistance service system may be billed on a per call basis, or may be billed, depending upon a variety of factors, such as the duration of the information assistance/operator time, or the event type or class of information searched.

Bills are typically compiled from event records, such as call detail records ("CDRs"), generated at a call center. For example, upon receipt of a directory assistance call, a carrier switch may generate a CDR and direct the call to the contracted information assistance service system. A servicing switch at the information assistance service system may generate a CDR upon receipt of the call from the carrier switch. Each "event" during the course of a call may cause generation of a CDR by a component of the call center involved in that event. An "event" may be any activity at the call center related to handling of the call. Examples of events include receiving an information assistance call, queuing a call while waiting for an operator to become available, connecting the call to an available operator, conducting a search of a database for directory assistance or other services, activating a voice response unit (VRU), connection to a destination number, etc. The generation of CDRs for such events is described in application Ser. No. 09/777,061, filed on Feb. 5, 2001, which is assigned to the assignee of the present invention and is incorporated by reference, herein.

The CDR or CDRs generated during a communication contain the communication related information necessary to compute a bill for the communication, such as call duration, toll connection, information assistance service, and the type and/or class of information service provided, to the extent that charges vary depending upon the type of information service provided. CDRs are sent to a billing platform, which compiles the CDRs for each call and for calls for each customer. The billing platform may be at the carrier, information assistance service system or a third party to generate a bill.

Typical bills for direct dial telephone services identify the date, time, called phone number and duration of the call, and the geographic location of the called party. Information assistance calls, which may be included in the same bill as direct dial calls provided by the carrier, may only include the date of the information assistance call. It may also include the requested phone number. If the information assistance call is connected to the requested phone number, the date, time, phone number and geographic location of the called party, which may be an individual or business, for example, will appear on the bill, as if the call was dialed directly by the customer.

When a customer reviews a telephone bill, the customer may not recognize the called number or remember who was called on a particular date at a particular geographic location. Believing that they have been misbilled, the customer may call their carrier to request credit for the call. Often, the call was not misbilled, but much time and expense is accrued to clarify the situation. Perceptions by customers of being misbilled, even when erroneous, may also generate ill will. An improved system for handling credit inquiries and processing credit requests is described in more detail in U.S. application Ser. No. 10/160,415, filed on May 31, 2002, assigned to the assignee of the present application and incorporated by reference herein.

U.S. Patent Application Publication US 2001/0017915 A1 (the '915 application), published on Aug. 30, 2001, describes a system and method of creating a billing record including a called party's name, to facilitate review of a bill by a customer. In the '915 application, a phone number of a called party is extracted from an original event record after a call is completed, by a billing system. A database correlating phone numbers with corresponding parties' names is queried to identify the name of a party associated with the called number. A modified call record is then created including the party's name. A billing record is created from the modified call record. This process is repeated for cacti call in a billing time period to create a bill. While providing a called party's name in a bill would eliminate some erroneous requests for credit, the disclosed method is complex and may be expensive to implement.

SUMMARY OF THE INVENTION

In accordance with one embodiment of the invention, a method of operating a communications system for providing a service is disclosed, wherein a plurality of parties may be associated with an account with the system to receive the service. The method comprises providing a bill for a service requested by one of a plurality of parties associated with an account and provided by the system, to a communications device via a network. The method further comprises providing an indicator of the one party requesting the service, in association with a respective entry for the service. The one party may be identified, at least in part, based on a voiceprint of the one party received when the request was made and a voiceprint sample of the party stored by the system. The system may be an information assistance service system and the method may comprise receiving a request for information assistance from the one party, with respect to a second party. The service may be establishing a communications connection between a first communications device of the one party and a second communications device of a second party and the method may comprise receiving signals to establish a communications connection between the first communications device and the second communications device. The communications device may comprise a display and the network may be the Internet.

In accordance with an aspect of this embodiment a communications system for providing a service is disclosed, wherein a plurality of parties may be associated with an account with the system to receive the service. The system comprises an interface to a network and a processor coupled to the interface. The processor is programmed to provide a bill for a service requested by one of a plurality of parties associated with an account and provided by the system, to a communications device via the network. The processor is also programmed to provide an indicator of the one party requesting the service, in association with a respective entry for the service in the bill. The processor may be programmed to identify a party based, at least in part, on a voiceprint of the party received when the request was made and a voiceprint sample of the party stored by the system.

In accordance with another embodiment of the invention, a method of operating a communications system is disclosed, wherein the system provides a service for a first party with respect to a second party. The first party is associated with an account with the system. The method comprises providing a bill for the account for a service provided to the account, to a communications device via a network and providing an indicator of the second party in association with an entry in the bill for the requested service. As above, the service may be information assistance or call connection, for example. The method further comprises providing an option to either elect or suppress provision of the indicator. The option may be provided during registration with the system or via an activation point provided on the displayed bill, for example. The indicator may be at least one of a name and location information of the respective second party. Selected indicators of respective second parties may be suppressed.

In accordance with another embodiment of the invention, a method of operating a communications system is disclosed, wherein the system provides a service for a first party with respect to a second party. The first party is associated with an account with the system and the system stores contact information of the account in a contacts folder in a database. The method comprises providing a bill for the account for a service provided to the account and storing information related to the second party in the folder. An indicator of the second party may also be provided in association with an entry in the bill for the requested service. A plurality of first parties may be associated with an account with the system and the information may relate to contacts of a respective first party. The information may be stored in a respective folder. The respective first party requesting the service may be identified and the information inserted into a respective folder for that first party. The respective first party requesting the service may be identified based, at least in part, on a voiceprint of the first party received when the request was made and a voiceprint sample of the party stored by the system. The bill may be provided to a display device via a network.

In accordance with an aspect of this embodiment, a communications system for providing a service for a first party with respect to a second party is disclosed, wherein the first party is associated with an account with the system. The system comprises a database to store contacts information of accounts with the system in a folder associated with a respective account and a processor coupled to the database. The processor is programmed to provide a bill for services provided to the account and to store contact information related to the second party in the folder. The processor may also be programmed to provide a respective indicator of the second party in association with a respective entry for the requested service in the bill for the service and to store contact information related to the second party in the folder. The bill may be provided to a display device via a network.

In accordance with another embodiment of the invention, a method of operating a communications system is disclosed comprising establishing a communication with a first party requesting a communications number of a second party and processing the request for the communications number of the second party. The method further comprises generating an event record related to the request during processing of the request. The event record includes an indicator of the second party. The method further comprises providing a bill for the communication to a communications device via a network. The bill is based, at least in part, on the event record and includes the indicator of the second party associated with an entry for the communication. The indicator may be the name of the second party provided by the first party.

In accordance with another embodiment of the invention, a method of operating a communications system is disclosed comprising processing a communication between a first communications device of a first party initiating a communication with a second communications device of a second party. The method further comprises generating an event record related to the communication, including an indicator of the second party, during processing of the communications connection. The method further comprises providing a bill for the communication to a communications device via a network. The bill is based, at least in part, on the event record and includes the indicator of the second party. The indicator may be identified by searching a database for at least one indicator associated with a communications number of the second communications device.

In accordance with an aspect of this embodiment, a communications system for establishing a communication is disclosed comprising an interface to receive signals from a first communications device of a first party to process a communication with a second communications device of a second party and access a network. The system further comprises a processor programmed to generate an event record including an indicator of the second party, during processing of the communication; and to provide a bill for the communication to a third communications device via a network. As above, the bill is based, at least in part, on the event record and includes the at least one indicator of the second party.

In accordance with another embodiment of the invention, a method of operating a communications system is disclosed comprising receiving signals from a first communications device of a first party seeking a communications number of a second communications device of a second party. The method further comprises connecting the first communications device to an information assistance service to identify the communications number of the second communications device and establishing a communication between the first communications device and the second communications device after the communications number of the second communications device is identified. The method further comprises inserting an indicator of the second party into an event record generated by the communications system associated with connecting the first party to the second party, while establishing the communication between the first party and the second party. A bill is provided for the communication to a third communications device via a network. As above, the bill is based, at least in part, on the event record and includes the indicator of the second party.

In accordance with an aspect of this embodiment, a communications system is disclosed comprising an interface to receive signals from a first communications device of a first party calling an information assistance service system to obtain a communications number of a second communications device of a second party and to access a network. A control device coupled to the interface. The control device is programmed to connect the first communications device to the information assistance service and process a communication between the first communications device and the second communications device. The control device is also programmed to generate an event record of the communication between the first communications device and the second communications device, during processing of the communication between the first communications device and the second communications device, the event record including an indicator of the second party. The control device is also programmed to provide a bill for the communication to a third communications device via a network. As above, the bill is based, at least in part, on the event record and includes the indicator of the second party.

In accordance with another embodiment of the invention, a method of operating a communications system is disclosed wherein the system identifies a concierge, provider of at least one of goods and services. The method comprises receiving a request for identification of a concierge provider from a user. The request includes identification of at least one of goods and services. The method further comprises identifying an appropriate concierge provider based on the identification of the at least one goods and services. A bill is provided for the service of identifying the concierge provider. The bill includes identification of the at least one goods and services associated with an entry for the request for identification of the concierge provider. The bill may be provided to a communications device via a network.

A party may set up a subscription account for a period of time or the party may set up an account for a single transaction.

The terms "customers," "users" and "subscribers" are used interchangeably in the description and claims to refer to parties registered to use the system. The terms may include a party who is responsible for payment for use of the system pursuant to an account with the system and other parties the responsible party designates as being authorized to use the system under the responsible party's account. For example, the responsible party may authorize family members to use the system under the account. A business may authorize particular employees to use the system under the account.

BRIEF DESCRIPTION OF THE DRAWINGS

FIG. 11 is a view of a bill for communications services provided by a communications system, displayed on a monitor of a personal computer, for example:

FIG. 12b is an optional continuation of the method of FIG. 12a; and

DETAILED DESCRIPTION

In accordance with one embodiment of the present invention, in a communications system where a plurality of users may be parties to an account with the system, an indicator of the one of the plurality of users requesting a service is associated with an entry in a bill for the requested service, and the bill is provided to a display device via a network. The display device may be a personal computer ("PC") and the network may be the Internet, for example. In accordance with another embodiment of the present invention, a bill for communications services requested by a first party with respect to a second party includes an indicator of the second party, and is provided to a display device via a network. For example, in an information assistance call, where a first party calls an information assistance service system to request a phone number or other such communications number of a second party and optionally be connected to the second party, an indicator, such as the name and/or address of the second party, is included in a bill for the information assistance call. The second party may be any entity, such as an individual or a business, for example. The first party may also request the identity of a concierge provider in a geographic area. In another example, in a phone call or other such communication from a first party to a second party, the name and/or address of the second party is included in an on-line bill for the call. A party may also have an option of not including the identifiers. In accordance with another embodiment of the invention, information about a second party related to an entry in a bill for communications services may be transferred to a contacts folder maintained by the communications system. The second party may be identified in the bill and the bill may be provided to a display device via a network, as well. Embodiments of the invention may be used together or separately.

Providing indicators of the parties involved in communications facilitates a customer's review of a bill, decreasing erroneous requests for credit. In accounts where multiple parties may be associated with the same account and are commonly billed, identifying which party initiated a particular communication also facilitates bill review and may decrease erroneous requests for credit. Providing such bills to the user via a network further facilitates bill review, decreases the amount of paper sent to the customer and also facilitates the making of requests for credit by the customer, saving the customer time. It also facilitates implementations of options with respect to the information included in the bill and other uses of such information.

Figure 1:
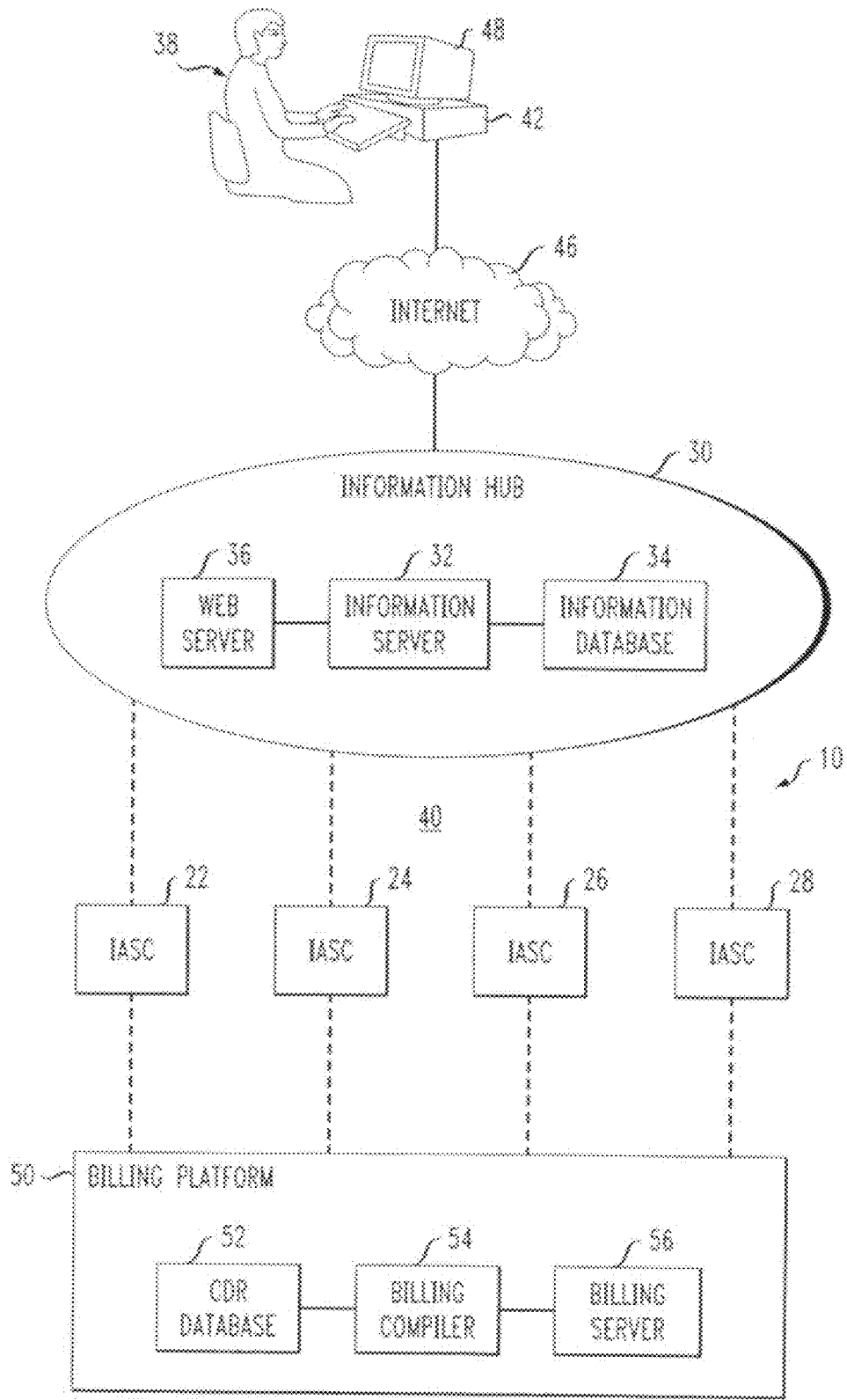
FIG. 1 is an example of a communications system, here an information assistance service system, including information assistance service centers ("IASCs"), an information hub and a billing platform, that may implement aspects of the present invention.

FIG. 1 is an example of a communications system 10 implementing embodiments of the present invention. In this example, the communications system is an information assistance service system. The information assistance service system 10 includes a plurality of operators dispersed throughout a wide coverage area in information assistance service centers ("IASCs") 22, 24, 26, 28. IASCs 22 through 28 are coupled to each other and to one or more information hubs 30 through a network 40. IASCs 22 through 28 are also coupled to billing platform 50 via network 40.

In this example, each of IASCs 22 through 28 covers one or more regional coverage areas. The network may be a wide area network ("WAN") 40 covering an extensive area, for example. WAN 40 can be an Internet-based network, such as the World Wide Web, or a private intranet based network. The information assistance service system may be accessed directly by a user on a wireline phone, wireless phone, personal data assistant ("PDA"), personal information manager ("PIM"), Blackberry and other communications devices. While information assistance service system 10 in this example includes a plurality of IASCs 21 through 27, the invention may be implemented in a system including a single IASC coupled on information hub 30 and billing platform 50.

Information hub 30 may include one or more processors, such as information server 32, which is accessible by the operators in the system 10, and one or more memory devices, such as information database 34, in which identifying information about each subscriber is stored and maintained. Web server 36 is also shown, coupled to information server 32. Web server 36 may be accessed by subscriber 38 via a personal computer ("PC") 46 via a network, such as the Internet 48. PC 46, or other such device, may have a display 48 and one or more input devices, such as a mouse and keyboard, (not shown), for example.

User information may be in the form of individual subscriber folders for each current subscriber account. Each subscriber account may include one or more individual subscribers. For example, a single account may include multiple members of a family or multiple employees of a business. Folders may be maintained for former subscriber accounts, as well. Each folder may be associated with one or more communications identifications of the respective subscriber's communications devices that the subscriber has registered with system 10 as part of the account. For example, the communications identification may be a phone number of a subscriber's wireline or wireless phone. The communications identification may be an Automatic Number Identifier ("ANI"), for example. The presence or absence of a subscriber folder corresponding to a phone number or other such identifying data may be used to indicate whether a caller is a subscriber to the system or not.

The folder may include a user profile, as described in co-pending application Ser. No. 09/865,230, filed on May 25, 2002 ("the '230 application"), assigned to the assignee of the present invention and incorporated by reference herein. The user profile may contain preferences of the subscriber related to subscribed services, such as preferred ways of being addressed, preferred language, preferred methods of receiving information from system 10. Information server 32 may include clock and calendar functions. The user profile may also contain a voiceprint sample of the one or more subscribers associated with the account. The voiceprint sample may be compared to a voiceprint received from a caller to verify the identity of the caller, enabling greater personalization of services, as described further, below.

The personal preferences in the user profile may be specified by a subscriber during registration with system 10 via a phone call, for example, in response to registration questions posed by an operator or a voice response unit ("VRU"), for example. Personal preferences may also be entered and changed via a web page. A subscriber will typically also register the phone number of each phone that may be used to call system 10, and identify the type of phone as a wireline or wireless phone. A phone that is used as a speakerphone may also be identified as such. In a voiceprint capable system, verbal utterances of a subscriber to system 10 may be collected during registration of the subscriber to derive voiceprint samples, as well, which is also discussed further below.

If multiple parties are registering under the same account, each party may establish a unique PIN and verbal utterances of each party may be collected and processed in turn. Each registered party may also establish their own preferences, which may be stored in separate folders or sub-folders associated with the respective PIN and/or voiceprint of that party to the account, as well as with the subscriber folder for the account. Each party to the account may thereby have a uniquely identified user profile. The subscriber folder and each of the associated profiles or sub-profiles, is associated with the ANIs of the phones registered with the account. The information may be organized in other ways, as well.

A subscriber folder may include a private directory in the form of a contacts folder, for example. The folder may contain the name, address and numbers of communications devices, such a phones, of parties to which the subscriber would like ready access. Authorized parties may enter contact information through one or more graphical user interfaces via personal computer 42 and the Internet 46, for example. Such directories are discussed in more detail in application Ser. No. 09/441,656, filed on Nov. 12, 1999, which is assigned to the assignee of the present invention and is incorporated by reference herein.

Subscriber folders and other such information may also be stored locally at one or more of the IASCs 22 through 28, as described in the '230 application. Local storage may speed access to the information by a respective IASC 22 through 28. The folders and information at different IASCs may be synchronized. Synchronized databases provide necessary backup as well as support to roaming mobile device users.

Web server 36 is coupled to information server 32 and/or other servers. Subscriber account information, such as bills, and information about system 10 may be stored in web server 36. A subscriber may access system 10 via a network, such as the Internet 46, via personal computer 42 or other such communications device, to access bills, change preferences, obtain information, etc. Access to system 10 may be at a predetermined uniform resource locator (URL) or website, for example. Such a website may be provided by web server 36 or by another server connected to the Internet 46. Web server 36 may be coupled to system 10 at other locations, as well.

Billing platform 50 may comprise a call detail record ("CDR") database 52, a billing compiler 54 and a billing server 56. Billing platform 50 generates billing records, which may be bills or precursors to bills, from event records, such as call detail records ("CDRs"), generated by IASCs 22 through 28 to document the events occurring during a call. An "event" may be any activity at the call center related to handling of the call. Each "event" during the course of a call may cause generation of a CDR by a component of the call center involved in that event. For example, upon receipt of a directory assistance call, a carrier switch may generate a CDR and direct the call to one of the IASCs 22 through 23. Other examples of events that may cause generation of a CDR include queuing a call while waiting for an operator to become available, connecting the call to an available operator, conducting a search of a database for directory assistance or other services, activating a voice response unit (VRU), connection to a destination number, etc. The generation of CDRs for such events is described in copending application Ser. No. 09/777,061, filed on Feb. 5, 2001, which is assigned to the assignee of the present invention and is incorporated by reference, herein. Billing platform 50 may be part of information assistance service system 10 or part of a network carrier. It may also be a third party contracted to compile information for bills, contracted by system 10.

The CDR or CDRs generated during a communication contain the communication related information necessary to compute a bill for the communication, such as call duration, toll connection, information assistance service, and the type and/or class of information service provided, to the extent that charges vary depending upon the type of information service provided. CDRs are sent to billing platform 50, which compiles the CDRs for each call and for calls for each customer.

CDR database 52 collects and stores CDRs generated by IASCs 22 through 28. Billing compiler 54 is a processor or computer that compiles CDRs related to the same call and to the same customer. CDRs related to the same call may be identified by a common identification number assigned to each CDR by an IASC 22 through 28 handling a particular communication, as described below. CDRs related to the same subscriber account may be identified by the ANI of the phone registered with the subscriber's account, for example, and incorporated in the CDR. A customer may have multiple phones with respective ANIs and/or other communications identifications registered with the account. Each ANI may cause generation of a separate bill or the charges for each phone may be compiled into a single bill. While a single CDR database 32, billing compiler 34 and CDR server 36 are shown, it is understood that multiple databases, compilers and servers may be used.

Billing server 56 generates a billing record, which may be a customer bill, or a precursor to a customer's bill, based on the compiled CDRs. Billing server 36 computes appropriate charges for each communication based on stored rate information and the CDRs, formats each bill and prints the bill to be mailed to a customer. An electronic bill may be generated instead of or along with the printed bill, for being e-mailed or otherwise sent electronically to the customer. The bill may also be made available through a website of the communications service, for example, in accordance with an embodiment of the present invention, as discussed further below. Billing server 56 also stores the generated bills and the underlying CDRs in appropriate memory (not shown) for later reference.

Billing platform 50 may be part of information assistance service system 10, part of a carrier, and/or it may be a third party. If billing platform 50 is part of a third party, a precursor to a bill, a billing record, is typically generated by billing server 56. The billing record is provided to information service system 10 for final formatting and presentation to a customer, by mail, e-mail or through the website. While a single CDR database 32, billing compiler 34 and CDR server 56 are shown, it is understood that multiple databases, compilers and servers may be used.

Figure 2:
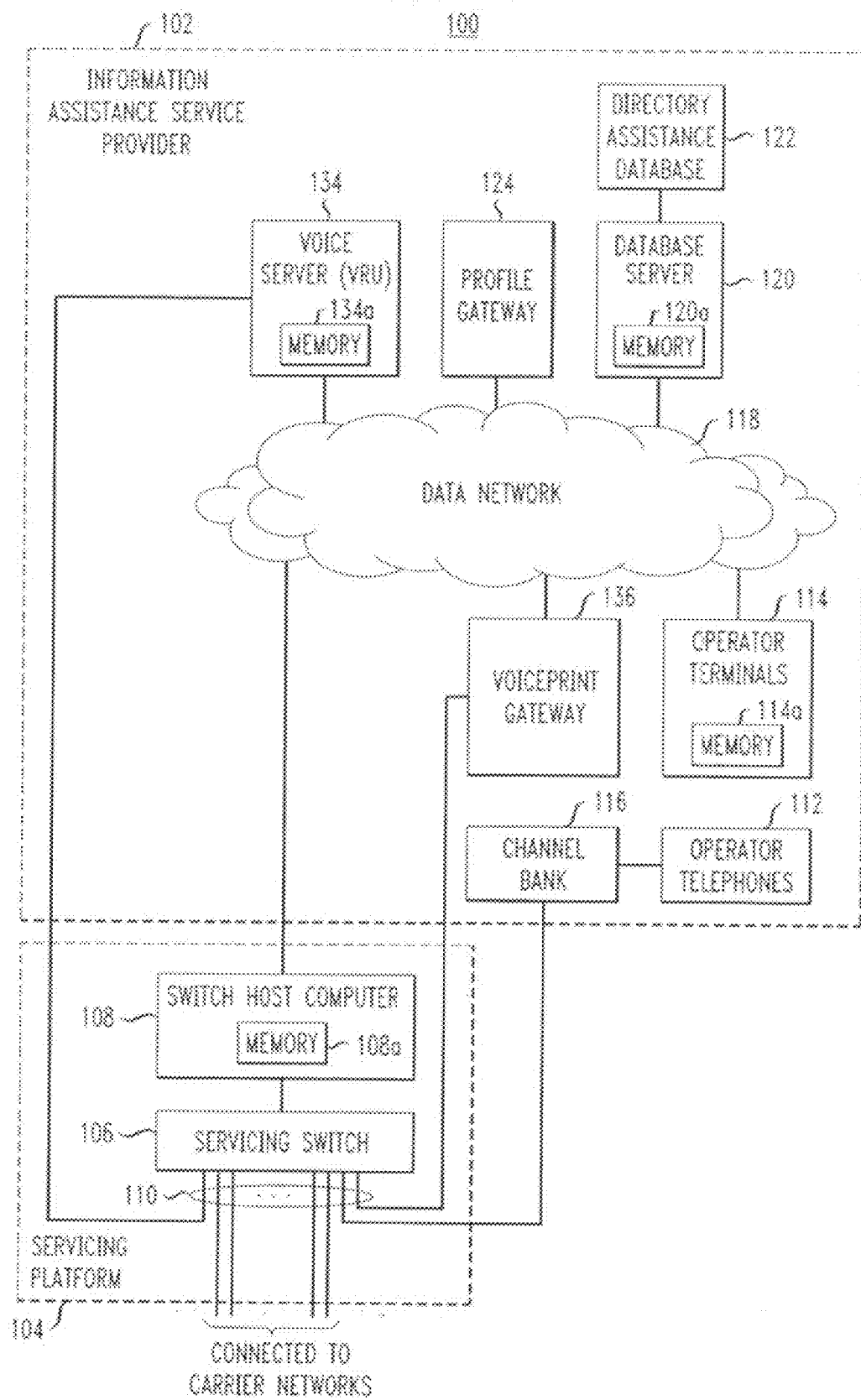
FIG. 2 is an example of an IASC of FIG. 1.

FIG. 2 is an example of an IASC 100 (generically representing each of IASC 22 through 28), embodying the principles of one embodiment of the invention. IASC 100 provides information assistance services and enables the name and/or address or other such indicator of a party called or a party whose number is requested, to be provided in a billing record, in accordance with an embodiment of the invention. IASC 100 includes information assistance service provider ("IASP") 102 and servicing platform 104. Servicing platform 104 may be part of or separate from IASP 102. Servicing platform 104 may be located in the same geographic area as or in a different geographic area than the associated IASP 102.

Servicing platform 104 includes an interface, such as a servicing switch 106, and a switch host computer 108. Switch 106 is a conventional switch connected via one or more external T1 links 110, including digital T1 links, to one or more carrier networks (not shown in FIG. 1). T1 links 110 may be voice, data or video connections through which incoming and outgoing voice, data, and/or video communications can be made. Outgoing communications may be placed over the same or different carrier networks than the carrier network on which the incoming communication was received. Switch 106 includes digital signal processing circuitry (DSPs). Thus, switch 106 can be programmed and reprogrammed to function as, among other things, call progress analyzers (CPAs), call progress generators (CPGs), multi-frequency (MF) tone generators/detectors, dual-tone multi-frequency (DTMF) generators/detectors, and/or conferencing units, depending upon the demand placed on IASP 102 and switch 106 for each corresponding function.

Figure 9:
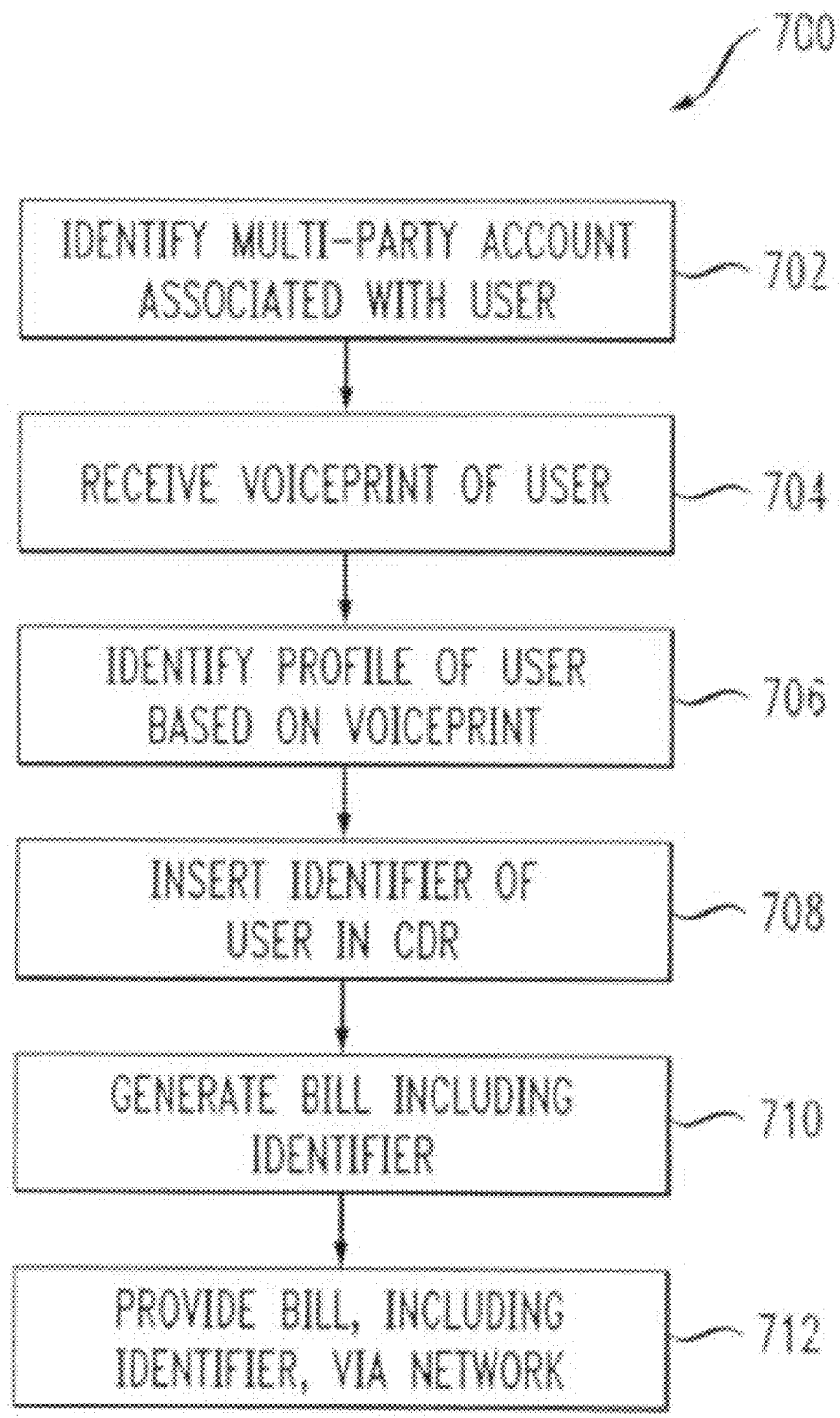
FIG. 9 is a flowchart of a method of identifying initiating parties of a call among a plurality of parties associated with a multi-party account, in accordance with another embodiment of the invention.

Switch host computer 108 may be programmed to control the operation of servicing switch 106, as well as the operation of the components of IASP 102 described below. Switch host computer 108 includes memory 108a. Switch host computer 108 and switch 106 may be private branch exchange ("PBX") components. In FIG. 9, in contrast, an IASP 900 is shown without a PBX switch and host computer.

IASP 102 includes operator devices, such as operator telephones 112 and operator terminals 114, handled by a respective operator. Each terminal 114 may include memory 114a, and a monitor, mouse and keyboard with associated dialing pad (not shown). Operator telephones 112 are coupled to channel bank 116 in IASP 102. Channel hank 110 is coupled to switch 106 in servicing platform 104 via an internal T1 link 110.

Operator terminals 114 are coupled over data network 118 to database server 120, which is coupled to directory assistance database 122. While only one database server 120 and database 122 are shown in FIG. 2, multiple servers and/or databases may be provided. Terminals 114 are generally provided with web browsing capabilities, telephone facilities and fully-featured operator user interface applications, which facilitate the searching, retrieval and administering of database 122 through database server 120.

Data network 118 includes, but is not limited to, a LAN. The LAN may connect to other similar remote LANs to form WAN 40 in FIG. 1. LANs may be connected to one another and/or to the Internet via routers and/or other conventional means. Thus, data network 118 enables an operator to access public directory information, private directory information, and/or other information available over the Internet.

An operator may submit a request for a party's phone number (wireline or wireless), or other such communications number of a party's communications device, to database server 120 through operator terminal 114. Database server 120 may search directory assistance database 122 in response to the request. If a number is located, it is retrieved by database server 120.

Figure 3:
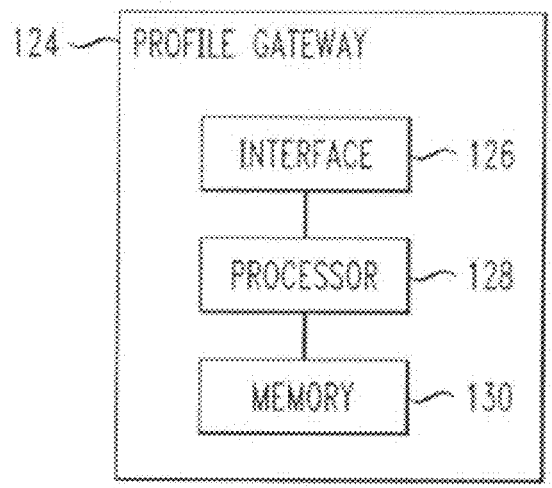
FIG. 3 is an example of a profile gateway of FIG. 2, in more detail.

If system 10 is voiceprint capable, IASP 102 may also include profile gateway 124 coupled to data network 118. Profile gateway 124 contacts information hub 30 to request information about a subscriber, such as a subscriber profile. Profile gateway 124 may comprise interface 126, processor 128 and memory 130, as shown in FIG. 3. Memory 130 here generically includes disks, caches and volatile and non-volatile memory. Subscriber profiles and profile gateway are discussed in more detail in copending application Ser. No. 09/865,230, filed on May 25, 2002, which is assigned to the assignee of the present invention and is incorporated by reference, herein.

IASP 102 may also include voice service (VRU) 134, which is also coupled to data network 118. Voice server 134 plays the constantly repeated parts of an operator's speech, namely, the various greetings and signoffs (or closings), and the retrieved telephone number of the party requested by the customer, under the control of switch host computer 107. Voice server 134 may also have voice recognition capability, so that it can interpret verbal statements made by a customer. For example, instead of connecting a call to an operator, switch host computer 108 may connect the call to voice server 134, which may request that the customer recite a requested party's name, as discussed further, below.

Voice server 134 may comprise a general purpose computer including memory 134a and one or more voice cards for voice recognition, voice recording and playback, and call progress analysis. Voice server 134 is connected to servicing switch 106 via a T1 line 110. If more than one Voice server 134 is provided, each one is connected to switch 106 via a separate T1 link. Voice server 134 is also coupled to switch host computer 108 through data network 118.

At appropriate stages in a call's progression, host computer 108 initiates a voice path connection between voice server 134 and switch 106, such that the customer or the customer and the operator are able to hear whatever pre-recorded speech is played on that connection by voice server 134. Computer 108 then instructs voice server 134, via data network 118, what type of message to play, and passes data parameters that enable voice server 134 to locate the message appropriate to the call state.

In a voiceprint capable system, voiceprint gateway 136 is provided to receive, record and digitize a voiceprint received from a caller. Voiceprints for use in developing a voiceprint sample or model for comparison to later received voiceprints, are also received and processed initially by voiceprint gateway 136. Voiceprint gateway 136 may be structurally similar to voice server 134 and their functions may be combined. Voiceprint gateway 136 may play instructions to a caller, as well, such as asking the caller to repeat a passphrase/password, for example, so that a voiceprint may be collected. Voice server 134 may be coupled to servicing switch 106 through voiceprint gateway 136, instead of being directly connected to it, as shown in FIG. 2.

Figure 4:
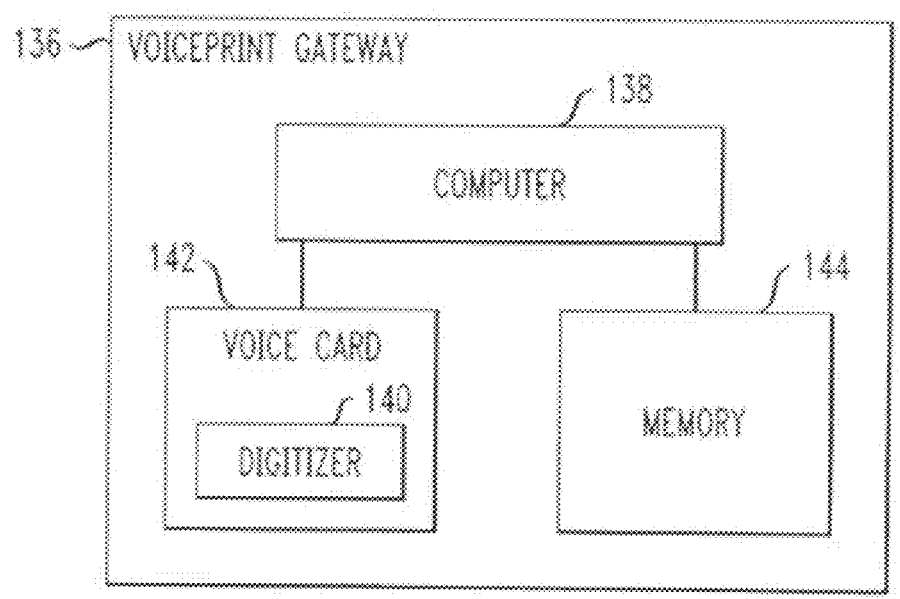
FIG. 4 is an example of a voiceprint gateway of FIG. 2, in more detail.

As shown in FIG. 4, voiceprint gateway 136 may comprise computer 138, such as a general purpose computer. One or more voice cards 140 and memory 144 are coupled to computer 138. Voice card 140 may include digitizer 142. As above, memory 144 generically includes disks, caches and volatile and non-volatile memory. Voiceprint gateway 136 is coupled to servicing switch 106 via one or more T1 links 110 and to data network 118. Voiceprint gateway 136 may be a LINUX server running suitable voice recognition or speaker identification software. For example, the voiceprint gateway 136 may run SpeechSecure™, available from SpeechWorks International, Inc., Boston Mass. Exemplary patents related to speech verification include U.S. Pat. Nos. 6,519,561, 6,480,825, 6,038,528, 5,862,519, 5,839,103, 5,634,087, and 5,634,087, which are incorporated by reference, herein. Suitable software may also be obtained from Nuance Communications, Inc., Menlo Park, Calif., for example.

Verbal utterances of a subscriber to system 10 may be collected during phone registration of the subscriber (or at a later time) to derive voiceprint samples. Voiceprint gateway 136 may be conferenced into the call, and request the new subscriber to repeat a passphrase or password several times, such as three times, for example. The passphrase or password is recorded and digitized by voiceprint gateway 136. The digitized voiceprints are encapsulated in a Voice XML file and sent to information server 32 with instructions that the voiceprints are to be processed to form voiceprint samples. Information server 32, which also runs SpeechWorks™ or other appropriate software, creates a mathematical representation of the voiceprints to form a voiceprint model or sample, and stores the voiceprint sample. Voiceprint gateway 136 or voice server 134 may process the voiceprints into voiceprint samples, instead of or along with information server 32, as well. Preferably, the voiceprint sample is stored in information database 34 as part of the subscriber profile in a folder for the new subscriber. Alternatively, voiceprints may be collected in a text independent mode as the subscriber responds to questions posed by the operator, voice server 134 or voiceprint gateway 136. Use of voiceprints in communications systems, including derivation of voiceprint samples through repetition of a passphrase/password in a text independent mode, is discussed in more detail in application Ser. No. 10/403,207, filed on Mar. 31, 2003, which is incorporated by reference, herein. The collection of additional text independent voiceprints during subsequent conversations between a user and system 10 to derive voiceprint samples is also discussed therein.

If multiple parties are registering under the same account, verbal utterances of each registered party may be collected and processed in turn. Each registered party may also establish other preferences, such as how they wish to be addressed by the operator and what language they prefer when dealing with system 10, for example. The voiceprint sample identifying information and preferences of each registered party to the account are preferably associated with separate subscriber profiles or sub-profiles within the subscriber folder associated with the account. The subscriber folder, and hence each of the profiles or sub-profiles, is associated with the ANI of the phones registered with the account. The information may be organized in other ways, as well.

The passphrase or password or the text independent verbal utterances, is recorded and digitized by voiceprint gateway 136. The digitized voiceprints are represented by an XML, file and sent to information server 32 with instructions that the voiceprints are to be processed to form voiceprint samples. Information server 32, which also runs SpeechWorks™ or other appropriate software, creates a mathematical representation of the voiceprints to form a voiceprint sample, and stores the voiceprint sample. Preferably, the voiceprint sample is stored in information database 34 as part of the subscriber profile in a folder for the new subscriber.

To access IASC 100 of information assistance service system 10, customers of a particular telephone carrier or company may dial, speak or otherwise communicate the access digits, access codes or retail numbers established for information assistance by that carrier to access information assistance service system 10. For example, the predetermined access digits may be "411," "*555," "555-1212," "1-800-555-1212," "00," or other designated access numbers. Upon receiving such access digits from a customer's communications device, the participating telephone carrier's switching system routes the call to an IASC 100 of information assistance service system 10 (via a T1 link), where it appears as an incoming call. Customers and other users of information assistance service system 10 may also call the system directly, in which case the call is also received by servicing switch 106 along one of the T1 links 110.

To connect a call to an IASC 100, a carrier network switch (not shown) of a participating carrier sends call setup signals containing data concerning the call, such as an ANI of the originating communications device, a dialed number identification service (DNIS) string identifying the dialed telephone number or other such communications number, the area of the call's originating site, and/or a customer identification number assigned by the carrier, to servicing switch 106. The received set-up signals are monitored and processed by switch host computer 108, which assigns a call sequence number to the call to uniquely identify the call within the information assistance system 100. A CDR is created for each call by switch 106, based on this information.

System 10 uses several criteria to identify a caller as a subscriber to the system before providing service to a subscriber. Preferably, at least two criteria must be met to verify the identity of a caller as a subscriber. In one example, the first criteria is a phone number or other such identifier of a phone registered with system 10. An identifier in the call set-up signals, such as the ANI, is identified and if the phone is registered with an account with the system, the phone and the associated account is identified. The DNIS may also be used under certain circumstances, as discussed above. A caller may also inform an operator of system 10 of a phone number of a registered phone, verbally. For example, if a caller is not calling from a registered phone, an operator or voice server 134 may request that the caller provide a number of a registered phone. The caller is thereby preliminarily identified as a particular authorized user (if there is only one user associated with the account), or as one of a limited number of authorized users associated with the account.

In this example, system 10 is a voiceprint capable system and the second criteria is the voiceprint of the caller. To verify that the caller is the preliminarily identified user or to identify the caller as a particular one of several authorized users, a voiceprint of the caller is compared with a stored voiceprint sample or samples of authorized users associated with the account to determine if there is an acceptable match.

In this example, if a voiceprint sample is not available or if voiceprint analysis is not conclusive, a third criteria may be other identifying information, such as a PIN, the user's mother's maiden name, etc. Preferably, either the first and second or the first and third criteria are used to verify identity. It is preferred not to use the second and third criteria together to verify identity. If system 10 is not voiceprint capable, the PIN is used as the second criteria and other information, such as mother's maiden name, may be used as a third criteria. This verification process will now be described in more detail.

To preliminarily identify the caller as a subscriber, switch host computer 106 may extract the ANI from the call setup signals and transmit the ANI to components of IASC 100, including profile gateway 124, through data network 118. Interface 126 of profile gateway 124 may receive the ANI and convey the ANI to processor 128. Processor 128 then requests information server 32 of information hub 30 (see FIG. 1) for a subscriber folder associated with the ANI or other such identifier in the call set up signals, via WAN 40. Information server 32 then searches information database 20 for such a subscriber folder. If a folder is found, it is sent to profile gateway 124, via WAN 40. The folder may be stored in memory 130.

If there is only one subscriber associated with the subscriber folder (and associated account), then system 10 preliminarily identifies the caller as that subscriber. If there are multiple parties associated with the folder (account), then system 10 has preliminarily identified the caller as one of those multiple parties.

The call may then be directed to an operator device, such as operator telephone 112 and operator terminal 114 of an available operator, by switch 106 under the control of switch host computer 108. Information in the subscriber folder, such as the subscriber's name and preferences, is made available to an operator from profile gateway 124 via their respective terminal 116.

Automatic call distribution (ACD) logic, which may reside in switch host computer 108 or elsewhere in system 100, may be used to queue (if necessary) and distribute calls to available operators at operator devices in the order in which they are received, to evenly distribute the call traffic among the operators. Other distribution logic schemes may be used, instead, such as skills-based routing or a priority scheme for preferred callers.

To confirm the identity of the caller as the preliminarily identified subscriber, or to identify the caller as one of the multiple parties to the account, the operator may ask for a PIN or other such identifying information. If system 10 is voiceprint capable, the operator may ask the subscriber to state their passphrase or password to verify their identity. Voiceprint gateway 136, which may be conferenced into the call, receives and digitizes the passphrase or password to form the voiceprint. The voiceprint is encapsulated within a Voice Extensible Markup Language ("Voice XML") file and sent to information server 32 with instructions to compare the voiceprint to the voiceprint sample or model in (or associated with) the subscriber folder in information database 34 identified through the ANI (and already provided to profile gateway 124). The digitized voiceprint is compared to the voiceprint sample to yield a statistical measure of the correspondence between the two. The measure may be a confidence score, for example, indicative of the degree of correspondence between the received voiceprint and the stored voiceprint sample. The confidence score may be compared to a threshold to determine if the degree of correspondence is sufficient to conclude that the voiceprint and the voiceprint sample are from the same party, with an acceptable degree of certainty. If a score is below the threshold, the identity of the caller as a particular subscriber is not confirmed. The operator may then ask the caller for other information to confirm their identity, such as a PIN, name, address, mother's maiden name, etc. Voiceprint gateway 136 or voice server 134 may also compare the voiceprint to the voiceprint sample and compare the resulting confidence score to the threshold.

An upper and a lower threshold may be provided defining three ranges. If the confidence score is greater than or equal to the upper threshold, the identity of the caller as a particular subscriber is confirmed. If the confidence score is below the lower threshold, the test is failed and service will not be provided, unless the caller provides additional information to satisfy the operator that the caller is who they purport to be. For example, the caller could provide a name, PIN and mother's maiden name. If the confidence score is greater than or equal to the lower threshold but less than the upper threshold, the results are ambiguous and the operator, voice server 134 or voiceprint gateway 136 may ask the caller to repeat the passphrase/password or provide other information, such as a PIN. On a scale of 0.0 through 1.000.0, the upper threshold may be 600 and the lower threshold 350, for example.

If there is only one subscriber to an account, then the voiceprint received from the caller need only be compared to the one voiceprint of that subscriber. In this case, the voiceprint verifies the identity of the subscriber, who has been preliminarily identified based on the ANI or other such identifier of the subscriber's phone.

If there are multiple parties to the account, such as family members or employees of a business, there may be multiple voiceprint samples in or associated with the account. The received voiceprint may be compared to each voiceprint sample and the identity of the caller may be determined based on the voiceprint sample with the highest confidence score greater than or equal to the threshold. Multiple thresholds may be used, as described above. In this way, a caller may be identified without requiring input of a PIN or other such information.

If a subscriber is calling from a public phone or another party's phone who is not a subscriber to system 10, the ANI of the phone will not be correlated with a subscriber account. In that case, the operator, voice server 134 or voiceprint gateway 136 may then have to ask for identifying information, such as the caller's name or phone number of the phone registered with the system. The caller's voiceprint may then be used to verify the identity of the caller. Further information may be requested to verify the identity of the caller, such as the user's PIN, password, mother's maiden name, etc. The voiceprint may then be used, if desired, to provide further verification that the caller is the subscriber corresponding to the PIN, etc.

If the caller is using another subscriber's phone, then the system will preliminarily identify the caller as that other subscriber. The voiceprint of the caller should not, however, sufficiently correspond to the voiceprint of the other subscriber and the identity of the caller as the subscriber will not be verified. Again, the operator, or voice server 134 or voiceprint gateway 136 may then ask the caller for the caller's name and/or phone number of a registered phone. The voiceprint and/or other identifying information may then be used to verify the identity of the caller, as discussed above.

Voiceprints work best in identifying one out of a limited number of parties. In most cases, the ANI will narrow the class of probable callers to the one or limited number of parties associated with an account. The voiceprint of the caller may then be used to readily and quickly verify the identity of the one party or determine which one of a limited number of parties is the caller. If there are too many parties associated with the account to match a voiceprint in a reasonable amount of time, it may still be necessary for an operator or voice server 132 to intervene and request additional information. A voiceprint may be compared to up to about 25 voiceprint samples in a reasonable amount of time with acceptable accuracy for a typical information assistance system, for example.

After verification of the identity of the subscriber, the operator may address the subscriber by the name found in the subscriber folder. The subscriber may then request information assistance, such as the phone number and/or address, of a party. The subscriber may also make a concierge request for the identity (the name, address, and phone number for example) of a provider of particular goods and services, including food and entertainment services.

The operator may enter the name of the requested party into a field of a graphical user interface ("GUI"), which may be a form template appearing on the display of the operator's terminal 116, through a keyboard or other such input device. The entered name is stored in memory 114a in a location corresponding to the name field of the GUI. The operator submits the requested party's name to database server 120 via data network 118 by clicking on a button or tab on the screen or depressing a key on the keyboard. Database server 120 stores the name in memory 108a and conducts a search of directory database 122 for a communications number associated with the name. The name may be stored in switch host computer memory 108a when the name is submitted to database server 120, as well. Database server 120 may not find a communications number corresponding to the exact name given by the customer, in database 122. The name might be in a different form. For example, in the database, only the first initial of the first name may be stored with the last name. The customer may give a nickname instead of the full first name, as well. Database server may store the name as it appears on the database in memory 120a, as well as the name given by the customer. The name inserted into the CDR, and ultimately the bill, is preferably the name given by the customer, which is input to IASC 100 and stored in memory. Alternatively, the name as it appears in the database may be used, instead. In that case, the name may be retrieved from the database, stored in memory and copied into an event record.

If a phone number or other such communications number corresponding to the requested party's name is found, the number may be stored in memory 120a and may then be sent to the requesting operator terminal 114 by database server 120. The retrieved number may be stored in memory 114a and displayed on the operator's monitor. The customer may be verbally informed of the number by the operator. Alternatively, the number may be provided to voice server 134 via switch host computer 108, and stored in memory 134a. Voice server 134 may then generate a message reciting the number. The name may be input by a customer using a keypad on their communications device, as well.

The information assistance call may then be terminated or the customer may be given the option of being connected with the communications number (i.e. telephone number) of the requested party, as is known in the art. The option may be presented by the operator or by voice server 134. The customer may accept the option by a verbal indication to the operator or voice server 134 or by entry of data through the customer's phone or other communications device. Entry of data may involve depression of one or more particular keys on a keypad of the communications device, for example. If the call is connected to the requested party, servicing switch 106 may send call setup signals for the call, including the requested party's number as a DNIS, to a carrier switch for connection to the requested party. Alternatively, system 10 may connect the call to the requested party via servicing switch 106. The information assistance call is completed. The connection between the customer and system 10 may be terminated or it may be maintained in order to provide additional information assistance via the well-known StarBack® feature.

Instead of connecting the call to an operator at an operator device, switch host computer 108 may connect the call to voice server 134 to request verbal input of a requested party's name or concierge request and/or to present other options, as is known in the art. If voice server 134 can identify the name, the name is stored in voice server memory 122a and conveyed to data server 120 via data network 118, to conduct a search, as described above. If voice server 122 cannot identify the requested party's name, the call is connected to an operator device by switch host computer 108 for handling by an operator.

To make a concierge request, the subscriber may request the identity of a provider of a particular good or service, such as a provider of men's clothing or a movie theater in a particular area. The operator may insert the request into another field of the GUI, or use a different GUI, to input the request. The request may be similarly stored and provided to database server 120 to conduct a search of directory assistance database 122. Directory assistance database 122, which may be a typical directory assistance database, may be augmented to include information to address concierge requests, as well.

As discussed above, each component of IASC 100 involved in an "event" or activity may generate an event record or CDR to document the event and provide data for billing. For example, when a communication is received, servicing switch 106 may generate a CDR, under the control of switch host computer 108. When the communication is connected to an operator telephone 112 and terminal 114, terminal 114 or switch host computer 107 may generate a CDR. If the call is queued, switch host computer 108 may generate a CDR. When the operator sends a search request such as a search for a phone number corresponding to a requested party's name, terminal 114 may generate a CDR. When database service 120 conducts a search, database server 120 may generate a CDR. Generation of multiple event records is discussed in application Ser. No. 09/777,061, filed on Feb. 5, 2001, assigned to the assignee of the present invention and incorporated by reference, herein.

A CDR may include an indicator of the requested party, such as the requested party's name and/or address, facilitating generation of a bill including the indicator. CDRs are generated by multiple respective components of IASC 100, as described above and in application Ser. No. 09/777,061, or only one CDR is generated, such as by servicing switch 106. If multiple CDRs are generated by multiple components of IASC 100, any one including an indicator of the requested party may be used to provide the requested party's name to billing platform 30. An original CDR may be generated including a name field. The name field may be populated, along with other fields of the CDR, when the CDR is first generated. The generation and population of the CDR may take place in real-time, while the communication is being handled by IASC 100. It is not, therefore, necessary to modify a CDR later, during bill processing, as in the prior art. In other words, an indicator, such as a name and/or address, may be inserted into an original CDR.

An example of a method for inserting an identifier of a party that is the subject of an directory assistance search, will now be described with respect to the flowchart 200 of FIG. 5. Upon receipt of a request for the phone number of a party from the customer, the name of a requested party is stored in step 202. The name may be stored in memory 114a when the operator enters the requested party's name into a field of a GUI, through a keyboard or other such input device, for example. If the communication is being handled by voice server 134, the requested party's name may be stored in voice server memory 134a.

A search for the requested party's phone number or other such communications number is conducted in step 204. A request for a party's address may also be made. For example, the operator may submit the requested party's name entered in the GUI to database server 120 via data network 118 by clicking on a button or tab on the GUI or by depressing a key on the keyboard. If the requested party's name has been submitted to voice server 134, the name may be conveyed from voice server memory 134a to data server 120 via data network 118. The name may be stored in memory 120a in database server 120, which then conducts a search of directory database 122.

The number of the requested party is stored in step 206. For example, the number may be initially stored in memory 120a of database server 120. It may then be conveyed via data network 118 to memory 114a in the operator terminal 114 and displayed to the operator, or to memory 134a in voice server 134, for example. The number may also be conveyed to memory 108a in switch host computer 108.

The customer is informed of the number in step 208. The customer may be informed verbally by the operator, who may read the number displayed at terminal 114, or by a message generated by VRU 122.

After the number of the requested party is provided to the customer in step 208, the customer may be given the option of being connected with the located number, in step 210. The option may be presented by the operator or voice server 134. The customer may select one of the options by a verbal indication to the operator or voice server 134 or by entry of data through the customer's phone or other communications device. Entry of data may involve depression of one or more particular keys on a keypad of the communications device, for example.

If the customer accepts the option, the call is connected to the number, in step 212, via a carrier network, as is known in the art. The communication with IASC 100 is terminated and the requested party's name may be inserted into a CDR, in step 214. The operator may terminate the communication by clicking on a COMPLETE button or tab on the GUI or depressing a key on the keyboard, for example. The communication between the customer and the IASC 100 is then disconnected. In step 214, the requested party's name may be transferred from the field in the GUI to a name field in the CDR upon the operator's indication of the completion of the communication or upon the disconnection of the communication, by terminal 114 or switch host computer 108.

If the customer declines the option of being connected to the requested party in step 210 or if the system does not offer that option, the call is terminated and the requested party's indicator, such as their name and/or address, may be inserted into a CDR in step 214 by switch 106, for example, as discussed above.

The requested party's name may be inserted into a CDR at other steps in the process, in addition to or instead of in step 214. For example, if the components of IASP 100 have the capability of generating CDRs, as described in application Ser. No. 09/777,061, described in more detail above, operator terminal 114 or voice server 134 may copy the requested party's name from memory 114*a* or 122*a*, respectively, into a CDR under the control of switch host computer 108, after the requested party's name is stored in step 202. Database server 120 may copy the requested party's name from memory 120*a* into a CDR during documentation of the conducting of a search or the retrieval of a number, after step 204 or step 205. Database server 120 may copy the requested party's address from database 120*a* into memory 120*a* and into a CDR, as well. Switch host computer 108 could also acquire the requested party's name, store it in memory 108*a* and copy it into a CDR at any point.

The CDR is sent to a billing platform in step 216. As discussed above, the billing platform, such as billing platform 30, may be part of the information assistance service system 10, a carrier or a third party.

As discussed above, billing platform 30 may generate final bills or precursors to bills. Information assistance service system 10 may offer to provide billing entries with indicators, such as a party's name and/or address, as an option to customers. Customers may select an option among the following, for example: 1) providing both name and address, 2) providing the name or address, 3) providing another indicator or 4) providing no indicators. The customer may make such a selection during registration or any time after that. The customer may change their selection at any time. Based on the option selected by the customer, information assistance service system 10 may format a bill into a final form.

After the call is connected to the requested party via a carrier network in step 212, the carrier network will also generate CDRs related to the call. IASC 100 may pass the name and/or address of the requested party to the carrier network, along with the requested party's communication number, in the call setup signal stream typically provided by IASC 100 to the carrier network to enable call connection, via switch 106. The name and/or address may also be provided to the carrier network by IASP 100, via an Internet Protocol Detail Record ("IPDR"), sent via database network 118, which the carrier network can correlate with the CDRs it generates. For example, the IPDR and CDRs generated by the carrier network may be correlated through the ANI of the customer and the time and date of the call and/or the call sequence number assigned to that communication. Alternatively, the carrier network may acquire the name and/or address of the party to whom the call is being connected by searching a database, as discussed below.

As mentioned above, the customer may be connected back to the information assistance service system in accordance with the Starback® Service offered by the assignee of the present invention and described in U.S. Pat. No. 5,797,092, for example, which is assigned to the assignee of the present invention and is incorporated by reference herein. CDRs would typically be generated to document the connection back to the system. If the customer requests a new search for a communications number associated with a third party, CDRs may be generated including an indicator associated with the third party, such as a name and/or address of the third party, by repeating the steps of method 200.

Figure 6:
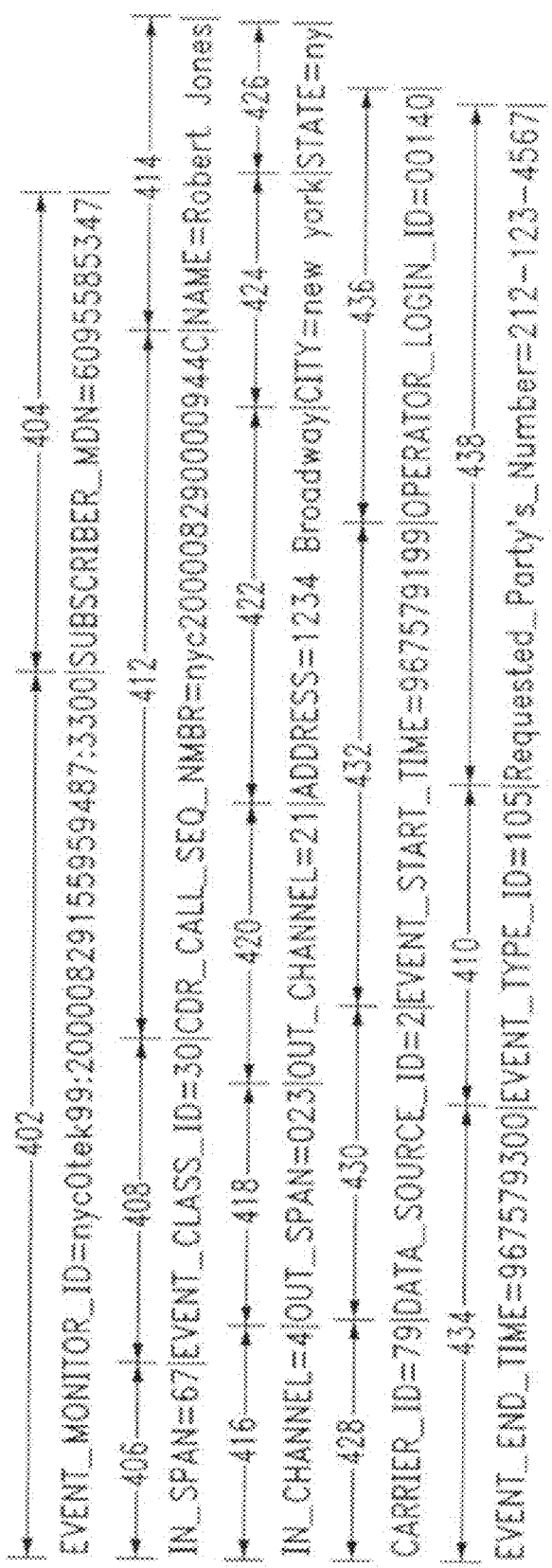
FIG. 6 is an example of a CDR for a directory assistance call, including a name and an address of a requested party, enabling insertion of a name and/or address of a requested party, into a bill.

FIG. 6 illustrates an example of a CDR 400 that may be generated by IASC 100 to document an information assistance search during an information assistance call. The CDR may include multiple fields describing an information assistance communication. Specifically, EVENT_MONITOR_ID field 402 contains a sequence of alphanumeric characters uniquely identifying CDR 400. SUBSCRIBER_MDN field 404 identifies the telephone number of the customer who made the information assistance call, i.e., the automatic number identification (ANI). IN_SPAN field 406 identifies the T1 span 110 transporting the incoming communication of the information assistance call.

EVENT_CLASS_ID field 408 is an optional field that may be used to identify a class of an event where CDRs are generated for multiple events, as described in application Ser. No. 09/777,061, discussed above. For example, the value "30" in field 211 in this instance, corresponds to a SEARCHES class. Other values for field 211 may correspond, e.g., to CALL PROCESSING, VALUE ADDED SERVICE and LOCAL SERVICES classes. Another field, here EVENT_TYPE_ID field 410, specifies one of the event types within the class identified by the value in field 408. For example, the value "105" in field 410 in this instance, corresponds to a search for a number of a requested party event within the SEARCHES class. Similarly, other values for field 410 correspond to different types of events in an identified class.

CDR_CALL_SEQ_NMBR field 412 contains a sequence number identifying the information assistance call in question. If multiple event records are generated in the same information assistance communication to document different events taking place during the communication, as described in application Ser. No. 09/777,061, for example, they would share the same value in field 412. In that way, billing compiler 34 may identify and compile event records related to the same communication, as discussed above. Sequence numbers are generated and assigned by switch host computer 107, when the information assistance call is initially received by service switch 106. Host computer 107 then transmits the sequence number to switch 106, and any other component in IASC 100 that may generate an event record. For example, the sequence number for a call may be transmitted to operator terminal 114, voice response unit 122 and database server 120 to be incorporated in any CDR they generate, for that particular call.

In accordance with an embodiment of the invention, NAME field 414 contains a name of a requested party. As discussed above, terminal 114, database server 120, VRU 134 and/or switch host computer 108 may generate a CDR and populate NAME field 414. If the service provided by system 10 was responding to a concierge request, an identifier of the concierge request, such as the type of goods or services requested or the name of the identified provider, may be inserted into NAME field 414. Alternatively, a separate field may be provided to identify concierge requests.

IN_CHANNEL field 416 identifies the channel (within the T1 span identified by IN_SPAN field 406 described above), which the incoming communication of the information assistance call traverses. OUT_SPAN field 418 identifies the T1 span transporting the outgoing communication of the information assistance call, if any. OUT_CHANNEL field 420 identifies the channel (within the T1 span identified by field 418) which the outgoing communication of the information assistance call traverses, if the communication is connected to the requested party's communications number, for example.

An optional ADDRESS field 422 may contain the address of the requested party. CITY field 424 contains the name of the city, such as New York, in which the requested party is located. STATE field 426 contains the name of the state in which the requested party is located. CARRIER_ID field 428 identifies the network carrier used to connect the call. For example, the value "79" in field 424 identifies AT&T Corp. as the carrier in this instance. DATA_SOURCE_ID field 430 identifies the component of IASC 100 generating record 400. EVENT_START_TIME field 432 indicates the start time of the communication event in question. It should be noted that the value in field 432 corresponds to a UNIX "epoch" time, i.e., the number of seconds elapsed from Jan. 1, 1970. Similarly, EVENT_END_TIME field 434 indicates the end time of the event in question. Thus, with such event start and end times, the duration of the event in question can be determined, which may be used in computing charges for that call. OPERATOR_LOGIN_ID field 436 identifies the operator handling the event. The REQUESTED_PARTY'S_NUMBER field 438 may contain the retrieved number of the requested party.

Records of events which occurred in a call may be correlated by the same sequence identification number, such as CDR_CALL_SEQ_NMBR field 412 in FIG. 4, identifying the call. Each information assistance call is associated with customer information, such as ANI or SUBSCRIBER_MDN field 404 information as shown in FIG. 4, and/or a customer identification number assigned by the carrier.

Other fields, different fields and fewer fields may be provided in CDR 400, as desired or needed by the communications system. CDR 400 includes all information necessary for computation of charges by billing platform 50 for each call, so that bill processing may be readily performed.

Figure 7:
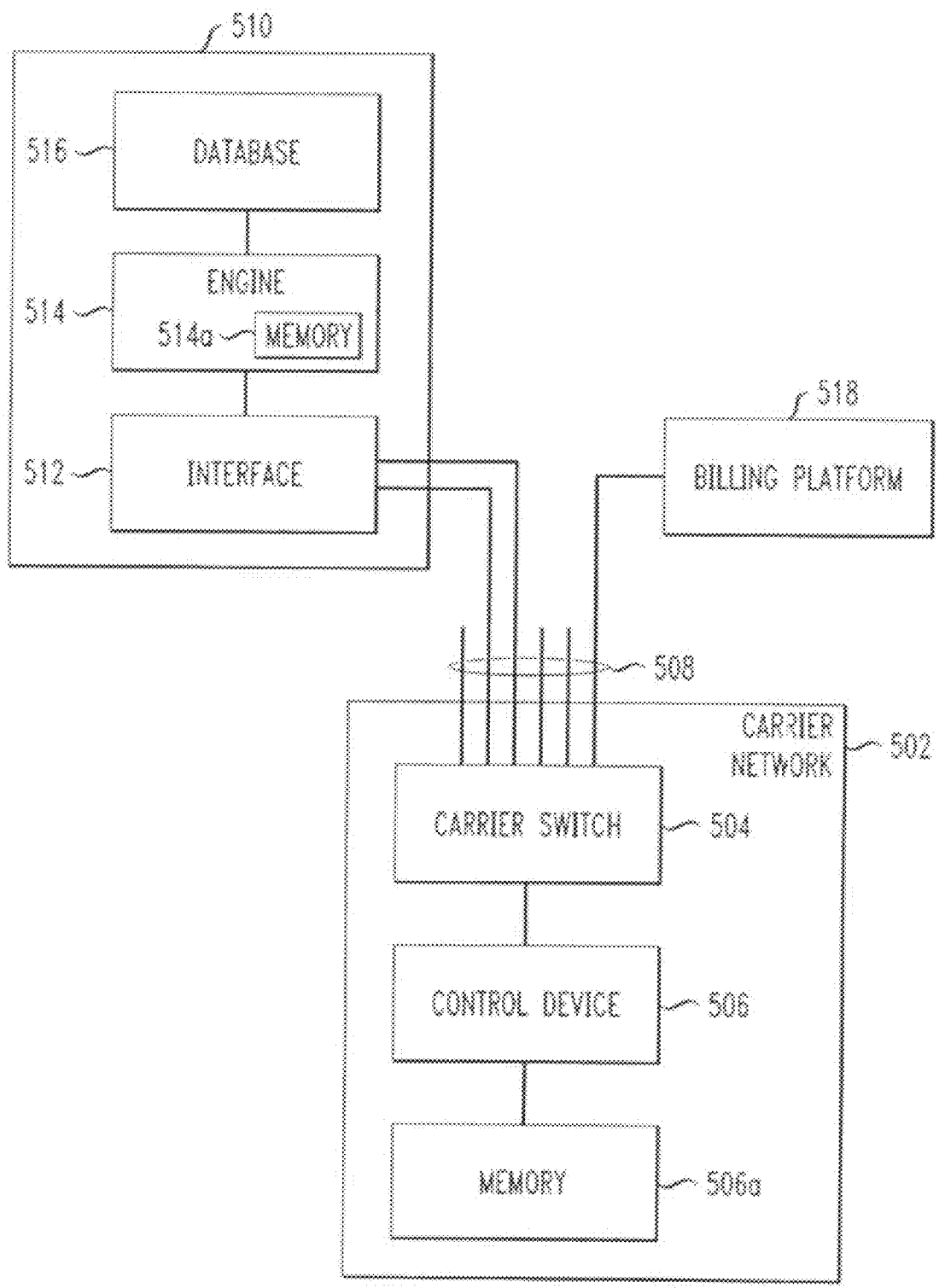
FIG. 7 is a block diagram of a carrier network and associated systems in another embodiment of the invention, adapted to identify a called party for insertion into a CDR record.

IASC 100 may readily insert a terminating party's name into a CDR, such as CDR 400, since the requested party's name is provided by the customer. FIG. 7 is a block diagram of a system enabling a telephone carrier network, such as Verizon Communications, which also generates CDRs to document events in processing communications between parties, to identify and convey an indicator of the called party, such as the called party's name and/or address, into a CDR during processing of a communication, in accordance with another embodiment of the invention. In that way, telephone bills itemizing calls made through the carrier may also include the called party's name in the bill.

Carrier network 502 includes carrier switch 504 and control device 506 with memory 506a. Control device 506 may be a computer or processor, for example. Carrier switch 504 is connected through a data connection 508 to DIP database system 510, which provides a name and/or address of a party corresponding to a given communications number, upon request. DIP database system 510 includes an interface 512, an engine 514 with memory 514a and a database 516. DIP database system 510 may be part of the carrier network 502 or may be a third party system.

Database 516 correlates communications numbers, such as phone numbers, with the names of party's associated with respective numbers, and their addresses. It may be a directory assistance database, for example. While a directory assistance database is typically adapted to be searched for a communications number associated with a given name, database 516 may already be adapted to, or may readily be adapted to, be searched for a name associated with a communications number ("reverse search"). Requests for a name and/or address associated with a communications number are received by interface 512 and conveyed to engine 514, where the name and address are stored in memory 514a. Engine 514 searches database 516 for a name and/or address associated with the number. Engine 514 may be a processor, computer or server, for example.

Identified names and/or addresses are provided from DIP database 516 to engine 514, which stores the indicator in memory 514a and provides the indicator to carrier switch 504 via interface 512 and data connection 508. The indicator may be stored in memory 506a, for example. Carrier switch 504 typically generates an event record, such as a CDR, under the control of control device 506. In accordance with this embodiment of the invention, the party's name and/or address stored in memory 506a is copied into an appropriate field in the CDR.

This process preferably takes place as carrier switch 504 connects the calling party to the communications number of the called party. The CDR in FIG. 6 may be readily modified by eliminating inapplicable fields and adding new fields for use as a CDR in a carrier network system.

Billing platform 518 is coupled to originating switch 504. Billing platform 514, which may have the same configuration as billing platform 50 in FIG. 1, collects, stores and compiles CDRs and generates bills based on the CDRs, as discussed above. Billing platform 518 may be part of carrier network 502 or may be part of a third party contracted to do billing for the carrier, as is known in the art. Switch 504 sends the CDR to billing platform 518 after the call is connected.

Figure 8A:
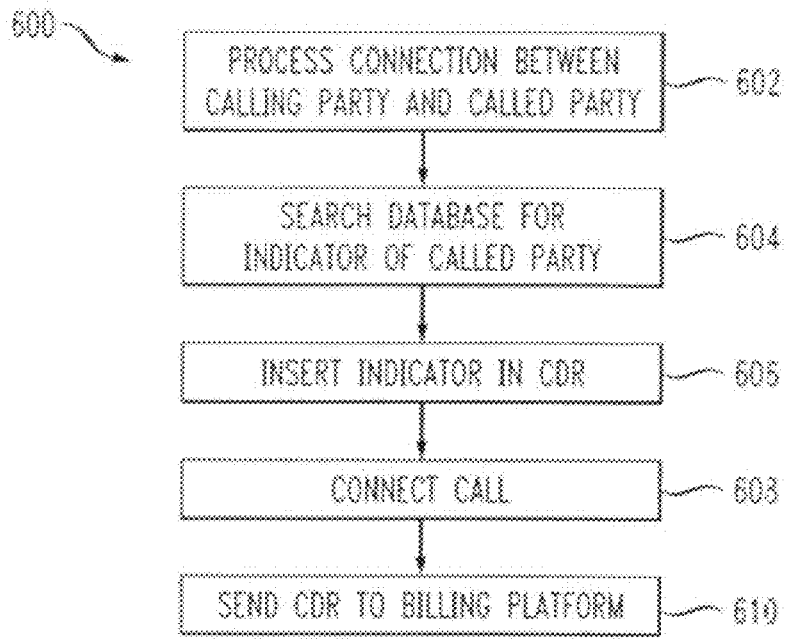
FIG. 8a is an example of a method for use by a carrier network, as in FIG. 5, for inserting an identification of a called party into a CDR.

An example of a method for a carrier network to identify a called party, is described with respect to flowchart 600 of FIG. 8a. After carrier network 502 receives a communication, such as a telephone call, processing of a connection between the calling party and the called party is initiated in step 602.

As the connection is being processed, a search is conducted for the called party's name and/or address, in step 604. For example, switch 504 may provide the communications number of the called party to a search engine, such as engine 514 in FIG. 5, through an interface 512. The communications number may be a DNIS derived from the call setup signals, for example. Engine 514 searches database 516 for a party's name and/or address associated with the communications number of the called party. If the party's name and/or address is found, either or both are provided to switch 504 through engine 514 and interface 512.

The called party's name and/or address is then inserted into a CDR, in step 606. For example, switch 504 may insert the name into a name field of a CDR generated by the switch for that communication and insert the address into the address-related fields 422, 424, 426, under the control of control device 506.

Processing of the communication is completed and the call is connected in step 608. After the call is connected, the CDR is sent to a billing platform, such as billing platform 518, in step 610.

As mentioned above, database 516 may be an information assistance database, adapted to retrieve party's names and/or addresses based on communications numbers. DIP database system 510 may therefore be part of an information assistance service system, such as system 10 of FIG. 1. In that case, engine 514 may be database server 120 and database 516 may be directory assistance database 121 in IASP 102 of FIG. 2. An interface (not shown) may be provided for the carrier network 502 to access database server 120. The method of FIG. 8a may be implemented if the database system 510 is part of the carrier, part of system 10 or part of another third party.

Bill processing may be readily performed, including insertion of a terminating party's name, with the CDR, as discussed above.

Figure 8B:
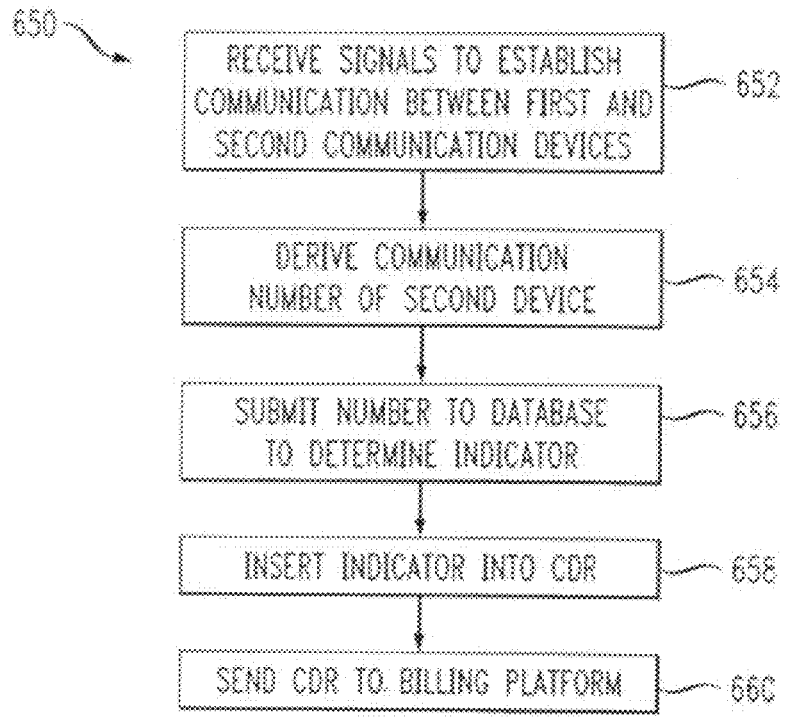
FIG. 8b is an example of another method for inserting an identification of a called party into a CDR, for use by a carrier network, as in FIG. 5.

Another example of a method for a carrier network to identify a called party is described with respect to flowchart 650 in FIG. 8b. Signals are received to establish a communication between a first communications device of a first party and a second communications device of a second party, in step 652. For example, call set-up signals may be received from the first communications device of the first party, who is initiating a call to a second communications device of a second party.

The communications number of the second communications device is derived in step 654. The communications number may be a DNIS in the call set-up signals, for example.

The derived communications number is submitted to a database to determine the second party's name and/or address, in step 656. The database may correlate communications numbers with respective parties' names and addresses. The database may be a directory assistance database that is part of a carrier network 502, part of an IASP 102 of information assistance service system 10 or a database system 510 of another third party.

If a name and/or address is retrieved from the database, it is inserted into a CDR or other such event record, in step 658. The name may be stored in memory 506a and copied into the CDR by carrier switch 504 under control of control device 506 or by control device 506 itself.

The CDR is then sent to a billing platform, such as billing platform 518, in step 660. This method may take place while the communication connection is being established.

A PIN provided by a caller may be used to identify a party of a multi-party account for billing and other purposes. Use of a PIN may be problematic, however, as customers often forget their PIN and the multiple parties to the account might share the same PIN. Identification of one of a plurality of parties to an account may be facilitated by the use of voiceprints. When a particular party of an account including multiple parties calls system 10, that individual may be identified by their voiceprint. Once identified, an identifier of the individual may be inserted into a call detail record ("CDR") for that communication. A single identifier may be used to identify several panics (such as the children in a family), while other parties (such as each parent) may have a separate identifier. This may be a preference established by the subscriber responsible for the account.

As discussed above, the CDR is provided to billing platform 50, which correlates other CDRs for the same call, as well as CDRs for other calls attributed to a particular account, in preparation for bill generation. In a bill for a joint account, calls attributable to each party to the account are thereby identified and may be listed separately. The identifier of each individual may be a name of the subscriber, a nickname, a PIN or other such number assigned to or selected by each subscriber, a phone number of the phone used to call the system or, a department number of a business, for example. The identifier may be inserted into a CDR by voiceprint gateway 132, for example. The billing platform may be part of the system 10, a network carrier or part of a third party, as discussed above.

FIG. 9 is an example of a method in accordance with this embodiment of the invention. The account associated with a caller is identified, in Step 702. As discussed above, the account may be identified based on the ANI in the call-setup signals. A voiceprint of the caller is received, in Step 704, by voiceprint gateway 136, for example. If there are multiple parties associated with the account, the identity of the caller is determined based on the voiceprint, in Step 706, as described above with respect to method 600 (FIG. 6a), for example. An identifier of the caller is then inserted into a CDR, in Step 708, by voiceprint gateway 136, for example.

Figure 10:
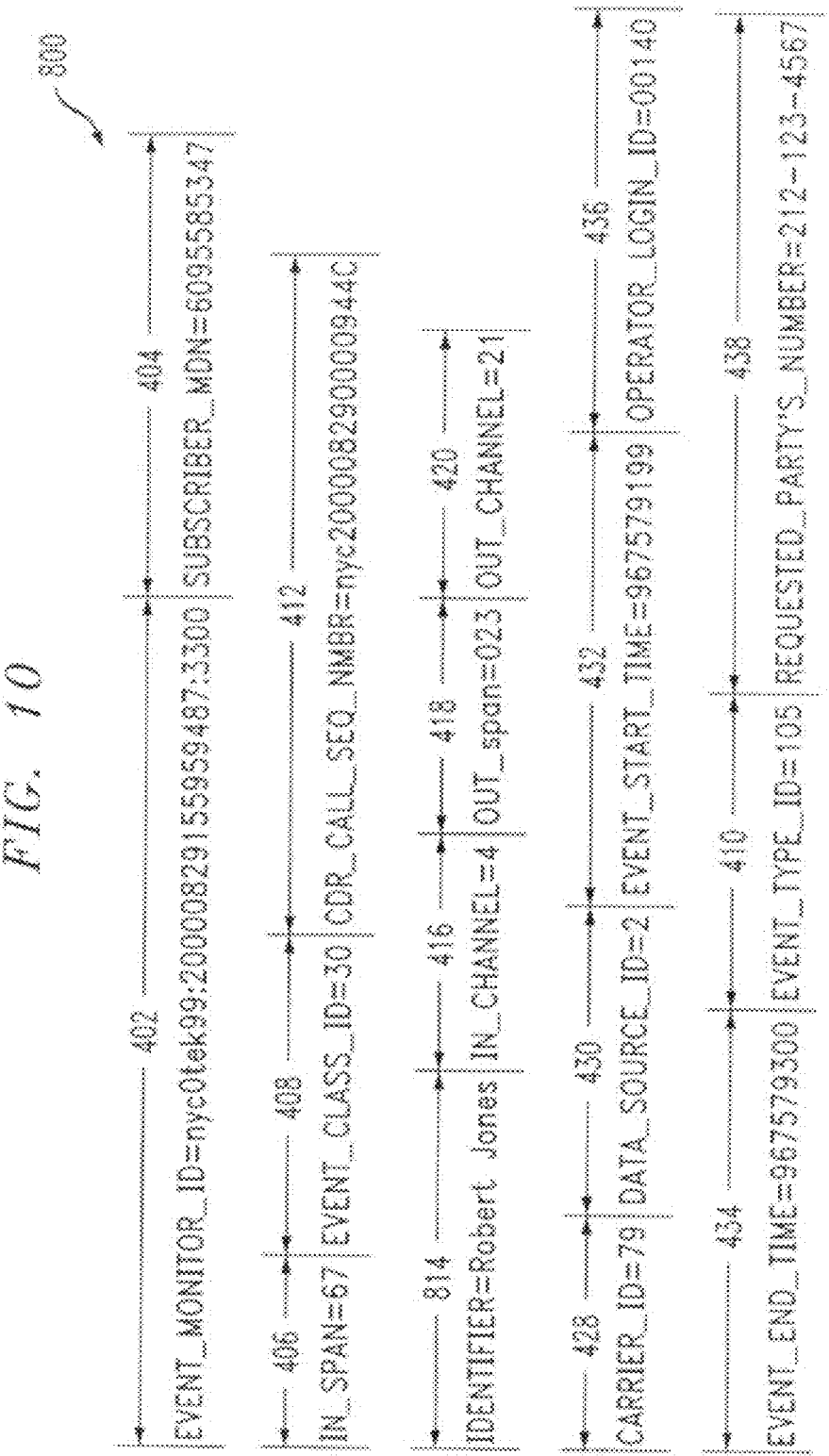
FIG. 10 is an example of a CDR including an identifier of an initiating party of a multi-party account, for use in the method of FIG. 9.

A standard CDR may be readily modified to include a field for such an identifier. FIG. 10 shows CDR 800 that may be generated by voiceprint gateway 136 and IASC 100, for example, to document an identification of a subscriber of a voiceprint information assistance search during an information assistance call. All the fields of CDR 800 are common to the fields of CDR 400 of FIG. 4, and are commonly numbered, except for IDENTIFIER field 814, which replaces NAME field 414. In accordance with this embodiment of the invention, IDENTIFIER field 814 contains an identifier of the party calling the system in that call. As described above, when there are multiple parties to an account, such as family members or business employees, the individual making the call may be identified by their voiceprint. If system 10 is not voiceprint capable, a PIN or other identifying information may be used to identify the particular caller. The identifier inserted into the CDR may be the name, nickname or password of the calling party, or a business department or division, etc. A CDR can include both NAME field 414 and IDENTIFIER field 814, as well.

In accordance with an embodiment of the invention, the bill for services provided by system 10, including an indicator of a second party related to the provision of the service, may be provided to an authorized party through a communications device, via a network. The network may be the Internet 46, for example. The network may be a WAN or a LAN, as well. The communications device may be a personal computer ("PC"), such as PC 42 in FIG. 1, which has Internet access or access to another such network. Other communications devices with access to the Internet or other such networks may be used, as well.

In the context of information assistance, an indicator of a party for whom information assistance is requested is provided in the bill, associated with an entry for the request. In the context of a concierge request, an indicator of the identified provider of the goods/services or the subject matter of the request (suits, for example), is associated with an entry for the request in the bill. In the context of call connection, an indicator of the called party is provided in the bill, in association with the entry in the bill for the call connection.

FIG. 11a is an example of a bill 820 for telephone/information assistance services provided to a first party who is seeking information assistance with respect to a second party, displayed on monitor 48 of PC 42, for example. The first party may call a carrier network that connects the first party to information assistance service system 10, or the first party may call system 10 directly. The second party may be any entity, such as an individual or a business. Entries 822 through 830 are indicative of respective requests for communications services. The request may be a request for information assistance, such as a request for a communications number or address of the second party, as in entries 822, 824 and 823. The information assistance may also be identification of a concierge provider of goods and/or services (suits, for example), as in entry 830. System 10 may also provide a communications connection between the first party, who initiates the communication, and the second party, as in entry 826.

Each entry 822 through 830 includes columns for a Date 834, Time 836, Description 838, Duration 840 and Charges 842 for the provided service. The bill also includes a "To" column 844, that includes respective destination phone numbers 846a through 846e for each entry 822 through 830. In accordance with one embodiment of the present invention, associated with each entry is a respective indicator 848a through 848e of the second party. The indicator may be a name of the second party, such as indicators 848a through 848c, for example. The indicator may also be location information 848d, such as a street address, for example. Both name and location information may be used, as well. In the case of a concierge request for identification of a provider of goods or services, the indicator may be the subject matter of the request, such as "suits" 846f, in entry 830. Other indicators may be used, as well.

In accordance with another embodiment of the invention, where there are a plurality of parties associated with an account with system 10, an indicator of the one of the plurality of parties requesting a particular service is associated with an entry for that service. For example, in FIG. 11, two parties to the account are indicated, Mary White 850 and Arthur White 852. Mary White 850 initiated the requests for service indicated by entries 822 and 824, while Arthur White 852 initiated the requests for service indicated by entries 826, 828 and 830.

The two embodiments may be used separately or together, as in the example of FIG. 11.

The bill may be in the form of a Hypertext Markup Language ("HTML") or Extensible Markup Language ("XML") file. The file may be stored on information database 34, in association with a user's account, or in other locations, such as in web server 36. An authorized user 38 (FIG. 1) may access their bill from a web page related to their account, for example. The bill may be a web page, as well. User 38, for example, may access bill 820 via personal computer 42, by requesting the web page related to their account via the Internet. Web server 36 may receive the request and have the page retrieved and sent to personal computer 42 via the Internet, for example. User 38 may have to enter a password and/or PIN to show authorization to access the bill. The account web page may also enable a user to change aspects of their account and user profile. For example, the user may add or remove communications numbers, such as phone numbers, of communications devices, such as wireline and wireless phones registered with the account. User 38 may change their preferences, as well.

System 10 may provide an option to display some or all indicators in bill 820. A user may not want a requested party's name provided on a bill, for privacy, for example. System 10 may have a default mode to either display or not to display all indicators and the option may be to either suppress or elect the provision of the indicator, depending on the default setting. The option may be one of the preferences selected by the user during or after registration and associated with their user profile. The web page containing bill 820 may have one or more activation points to suppress or elect the option. For example, "To" 844 may be activatable to reverse the default setting, suppressing all indicators 848a through 848f if the default setting is to display indicators, or displaying all indicators if the default setting is not to display indicators. A button or tab (not shown) may also be provided on displayed bill 820, activation of which either suppresses or elects the option. The option may also be presented on a graphical user interface ("GUI") displayed on display 48 of PC 42, for example. Bill 820 may be part of the GUI, as well. The GUI may provide a button or tab, activation of which changes the default setting. An activation point may be activated by a pointer or a mouse, for example.

System 10 may also provide an option of showing certain indicators of certain parties and not showing indicators of other parties. Indicators 848a through 848f may each be activatable to cause suppression of the respective indicator upon activation. If an indicator does not appear, clicking on a respective communications number 846a through 846f may cause the indicator associated with that number to appear.

A user may also select certain parties that should not be identified on bill 820. The selection may be part of a user's preferences established during registration or at a later time. The user may also indicate that a party should not be identified in bill 820, before or after the call to that party. The option may be presented by an operator or voice server 134, after information assistance is provided with respect to a second party and before the call is connected to the requested party, for example. Alternatively, the user may input a predetermined numerical sequence code via a keypad of a phone, to indicate that an indicator of the second party should not be included in the bill. Either the indicator would not be inserted in the CDR or CDRs for that communication or the indicator may be suppressed or removed from bill 820 prior to display. A filter may be used to search bill 820 for indicators 848a through 848f that are to be suppressed or removed, for example.

Indicators 848a through 848f could also be made activation points to cause display of a window or pop-up box including a menu of a plurality of options, including an option to suppress that particular indicator in that entry. That same indicator in other entries related to the same party may be suppressed, as well. Information server 32, for example, may suppress or remove the indicators, if the option is selected, for example. Other activation points may be used to provide such options, as well.

System 10 may also offer the option of selecting the type of indicator to be shown on the bill. For example, the user may select whether the second party's name, as in entries 822 through 826, or location information (such as street address), as in entry 828, or another such indicator, is used. Such a selection may be a preference selected by the user during registration or afterwards. The option may also be made via an activation point of bill 820, as described above. For example, the menu discussed above could include such an option. A button or tab may also appear on the bill, activation of which may present a menu, window or pop-up box offering the different indicator options. A GUI may be used, as well.

System 10 may also offer the user the option to pay their bill on-line. On-line bill payment may involve clicking on a button/tab 850 presented on bill 820. If credit card information is stored by system 10, activation of payment button/tab 850 may cause the bill to be charged to that credit card. Activation of payment button/tab 850 could also cause generation of a window, a pop up box or a GUI with fields for entry of credit card information and a button/tab to authorize charging of the bill to that credit card, for example.

System 10 may provide an updated bill on-line within a limited time after a call accruing charges has been made. For example, the updated bill may be provided on-line within 24 hours after the call is made.

As discussed above, system 10 may provide directories of contacts associated with an account or individual subscribers to an account, in a folder. The folder may be associated with the subscriber's account, in or with the user profile, for example. If there are multiple parties to an account, the contacts of an individual party calling system 10 may be identified and accessed through a PIN or by a voiceprint of the party. System 10 may offer users the option of adding a party associated with a requested service on their bill, such as a party for whom directory assistance has been requested or a called party, to their contacts folder. Then, the subscriber would not have to request directory assistance again for that party. The option may be offered via an activation point on bill 820, a menu or through a GUI, for example, as discussed above.

In one example, activation of indicators 822 through 830 may cause generation of a menu offering the option of transferring available information about the indicated party, into the contacts or other such folder. The information may be derived from the bill or from an event record (CDR) underlying the bill. Alternatively, a user may copy and paste the indicator of the party into the folder. Available information associated with the indicator may include the name, street address and phone number of the party, for example. The option may also be a preference previously set up by the user. The preference may provide for automatically adding information relating to all parties on the bill to the contacts folder. The contacts folder may be stored in information database 34, for example.

System 10 may also automatically add available information with respect to each indicated party in the bill, into a table or another folder (different than the contacts folder), for example, in a database, such as information database 34, to facilitate other types of customer service for a subscriber. For example, storing such information could enable the system to identify the last X number (where X is a real number) of calls made by the subscriber or find the most commonly called party or parties, upon the user's request. As above, the information is readily available from the bill, the associated billing record or underlying CDRs.

System 10 may also enable on-line customer service with respect to billing. For example, a request for credit may be included in the menu discussed above. System 10 may then investigate the entry to determine whether it has been properly billed. The request may be conveyed to a customer service department of system 10, for example. Web server 36 or information server 32 could evaluate the request, as well.

System 10 may determine that it is less expensive to grant certain credit requests than it is to investigate them. System 10 may therefore automatically grant credit when the request meets certain criteria. One criteria may be the total dollar value of the requested credit. That dollar value may relate to the actual cost to system 10 of investigation of the credit request. Requests for credit less than that amount may be automatically granted. Another criteria may be whether the request or requests for credit are less than a percentage (%) of the total charges in that bill. If the request is greater than that percentage, system 10 will investigate the request prior to granting the credit. Information server 32, web server 36 or another processor may conduct the analysis. It may be advantageous for system 10 to grant credit requests, even at a loss, to avoid the cost of investigating such requests and to develop goodwill of customers.

Another criteria that may be used in evaluating whether to grant a credit request without investigation may be a subscriber's or associated account's past history of credit requests. If a particular customer or account regularly requests credit, even if only for small amounts each request, it may be determined that they are abusing the system's 10 policy of granting automatic credits. At a predetermined point, system 10 may apply a higher degree of scrutiny to requests from that customer or account. The criteria may be a combination of the above. Additional criteria may be used, as well as or instead of those above.

Figure 12A:
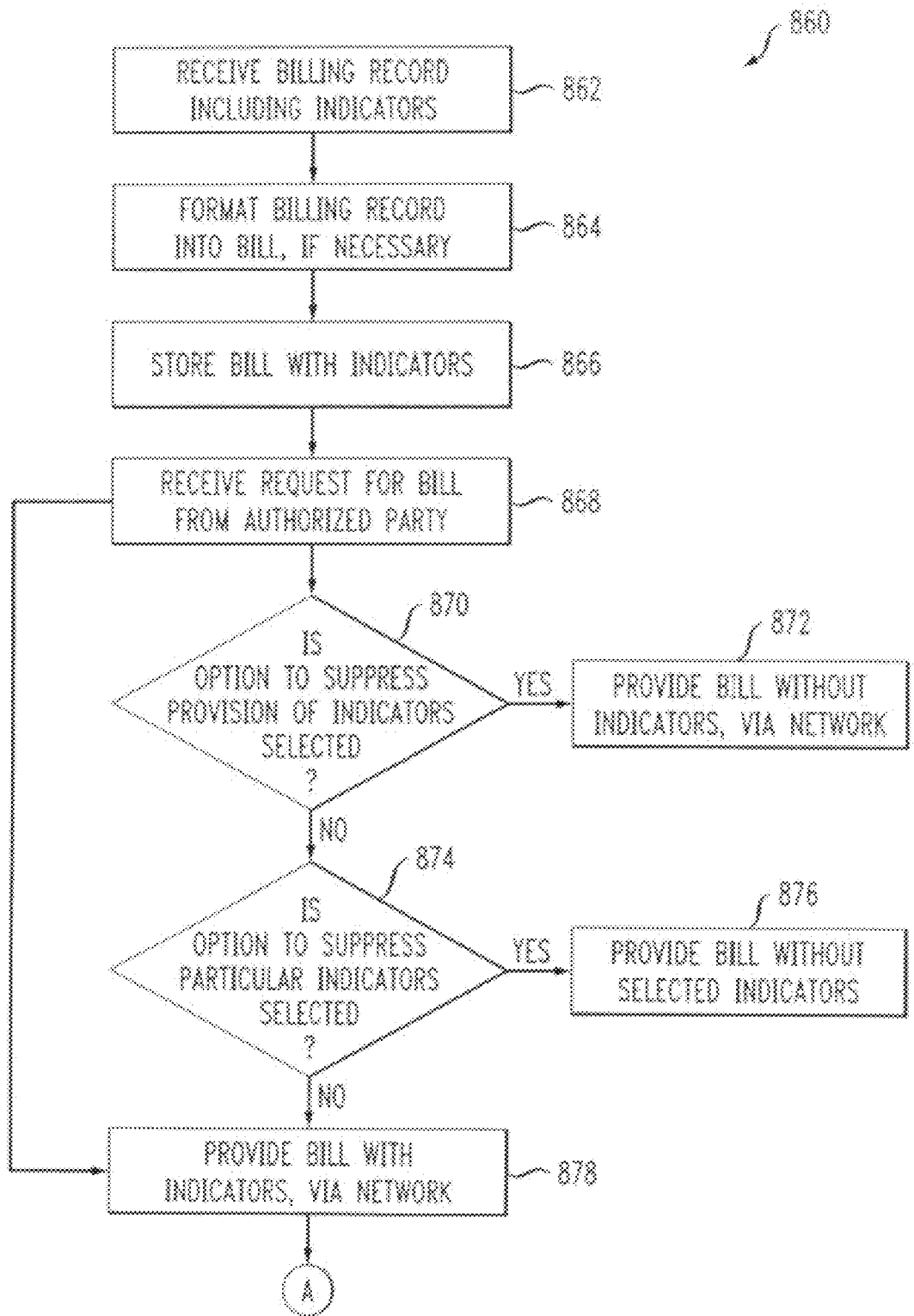
FIG. 12a is an example of a method in accordance with an embodiment of the present invention, to provide a bill including indicators of second parties associated with the call and optionally identifying a party of a multi-party account initiating a call.
Figure 13:
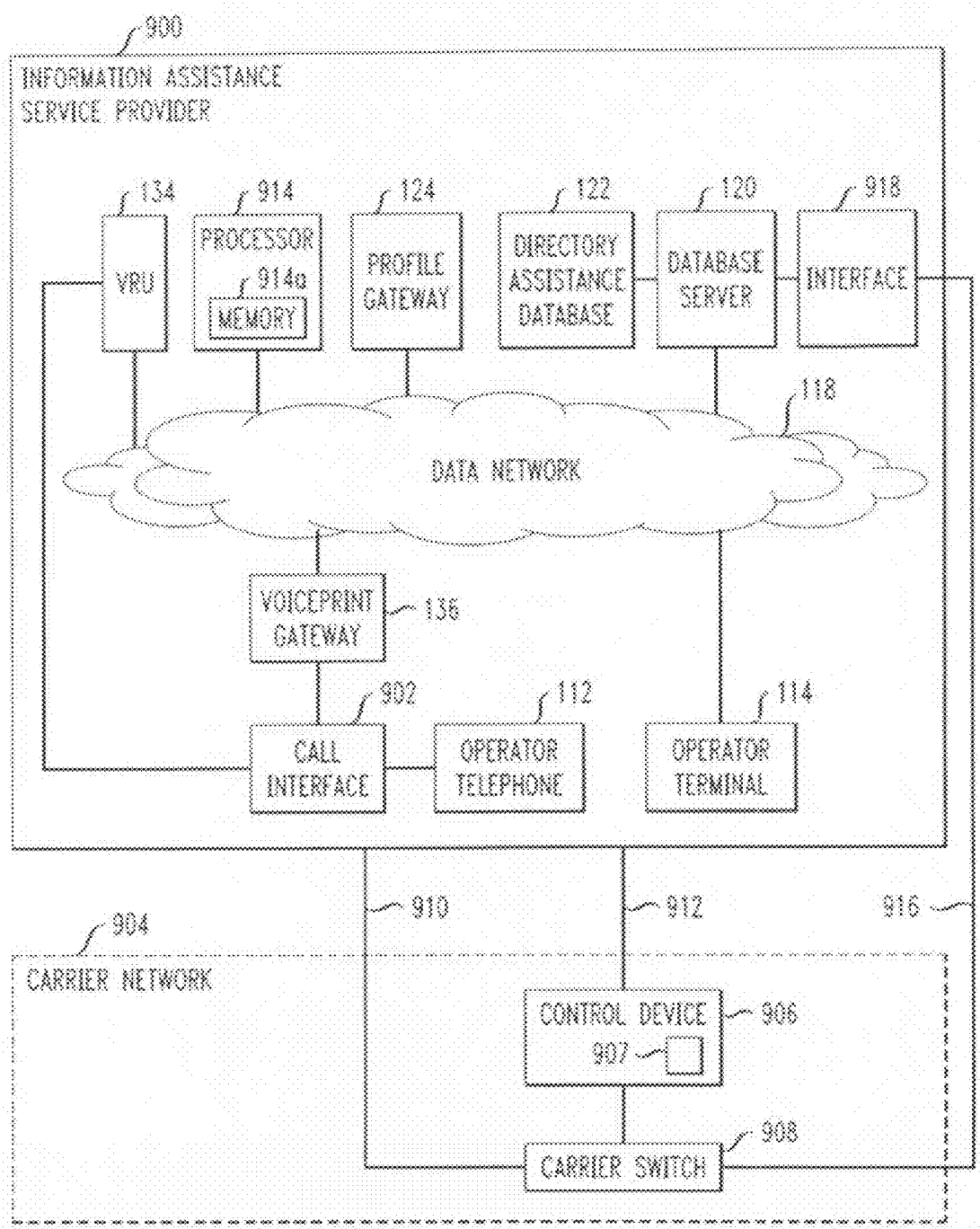
FIG. 13 is a block diagram of another configuration of an IASP in FIG. 1.

FIG. 12a is an example of a method 860 in accordance with an embodiment of the invention, wherein indicators of second parties and, optionally, identification of initiating parties, are provided in a bill provided to a user via a network. In method 860, a billing record for an account for a billing period is received in step 862. The billing records include indicators of the third party related to the service and, optionally, identification of an initiating party for accounts with multiple parties, as described above. The billing record may be received from a billing platform 50 via WAN 40, for example.

The billing record is formatted into a bill to be provided to a responsible party of an account, in step 864. Billing server 32 in billing platform 50 could format the billing record into a bill, for example. Information server 32 could format the record into a bill, as well.

The bill for an account is stored, in step 866. The bill may be stored by system 10 in information server 34 in association with a subscriber's profile, for example. It may also be stored in web server 36, for example.

A request to be provided a bill via a network is received from an authorized party, in step 868. The request may be received by information server 32 via the network, such as the Internet 46, for example. The request may be made through a computer, such as PC 42. Authorization may be confirmed by providing a PIN and password and/or other identifying information, for example.

If system 10 provides an option to suppress (or elect) the provision of indicators, the status of the option may be checked in step 870. If the option to suppress has been selected, then the bill is provided via the network, without indicators, in step 872. If the option to suppress has not been selected, and system 10 offers the option to suppress selected indicators, the status of that option may be checked in step 874, for example. If the option has been selected, the bill is provided without the selected indicators in step 876. If the option to suppress particular indicators is not selected, the bill is provided via the network, with indicators, in step 878. As discussed above, the options to suppress all or certain indicators may also be requested after the bill is received and displayed by the authorized users.

Method 860 of FIG. 12a may continue with further options in method 860a, as shown in FIG. 12b. For example, system 10 may determine whether a request for credit is received, in step 880. The request may be made through an activation point on the displayed bill 820 or on GUI containing the bill or a related GUI, as described above. If the request is received, the request is processed, in step 882, for example, as is also discussed above.

If the request is not received, or the request has been processed, method 860 may continue in step 884, where system 10 determines whether an option to transfer information about an indicated second party to a contacts folder, is received or has been previously selected. If Yes, the party is added to the contacts folder, in step 886, as discussed above. Information about the second party and the call may then be transferred to a database, in step 886, as is also discussed above. If the option is step 884 is not selected or received, method 860 may proceed directly to step 888.

Steps 880, 884, 888 may be performed in any order. Any or all those steps may be omitted (as could steps 870 and 874 in FIG. 12a). Method 860 may therefore continue from step 868, 870 or 874 in FIG. 12a, to any one (or more) of steps 880, 884, 888, as shown.

IASCs 22 through 28 of FIG. 1 may be configured differently than the IASC 100 of FIG. 2. FIG. 9 illustrates an alternative IASP 900. Components common to IASC 100 of FIG. 2 are commonly numbered. In IASC 900, call interface 902 is not connected to servicing platform 104, as in IASC 100. Instead, the functionality of servicing platform 104 principally is carried out in carrier network 904. Control device 906 in network 904 performs similar functions as switch host computer 124, and interface/carrier switch 908 performs not only its conventional carrier switching functions, but also those of servicing switch 120 described above, under control of control device 906. Control device 906 may include memory 907. Carrier switch 908 generates CDRs to document events conducted by carrier network 904.

In IASC 900, a communication, such as an information assistance call, is recognized by control device 906 when it is routed through carrier switch 908. Device 906 causes the communication to be connected through one of pre-designated direct inward dial (DID) connections 910 to provider 900. Control device 906 may also be connected to IASC 900 via an Internet connection 912. The communication is received by call interface 902 therein. Interface 902, coupled to operator telephones 112 and coupled to operator terminals 114 via data network 118, includes the aforementioned ACD logic for distributing the call to an operator at one of telephones in a conventional manner. Requests for information assistance are handled in the same manner as described above.

In IASC 900, a requested party's name may be inserted into a CDR in a variety of manners. Operator terminal 114, VRU 122 and/or database server 120, which may each have associated memory as shown in FIG. 2 and not shown in this view, may generate a CDR and insert the requested party's name into a field of the CDR, as described above. The method of the embodiment of FIG. 3 may be implemented, for example. Those CDRs may be correlated with CDRs generated by carrier network 904, as discussed above.

The name and/or address or other such indicator of a requested party may also be provided by IASP 900 to carrier network 904 via a data connection, such as Internet connection 912. Control device 906 may store the indicator in memory 907 and copy the requested party's name into the CDR generated by carrier switch 908, for example.

Figure 5:
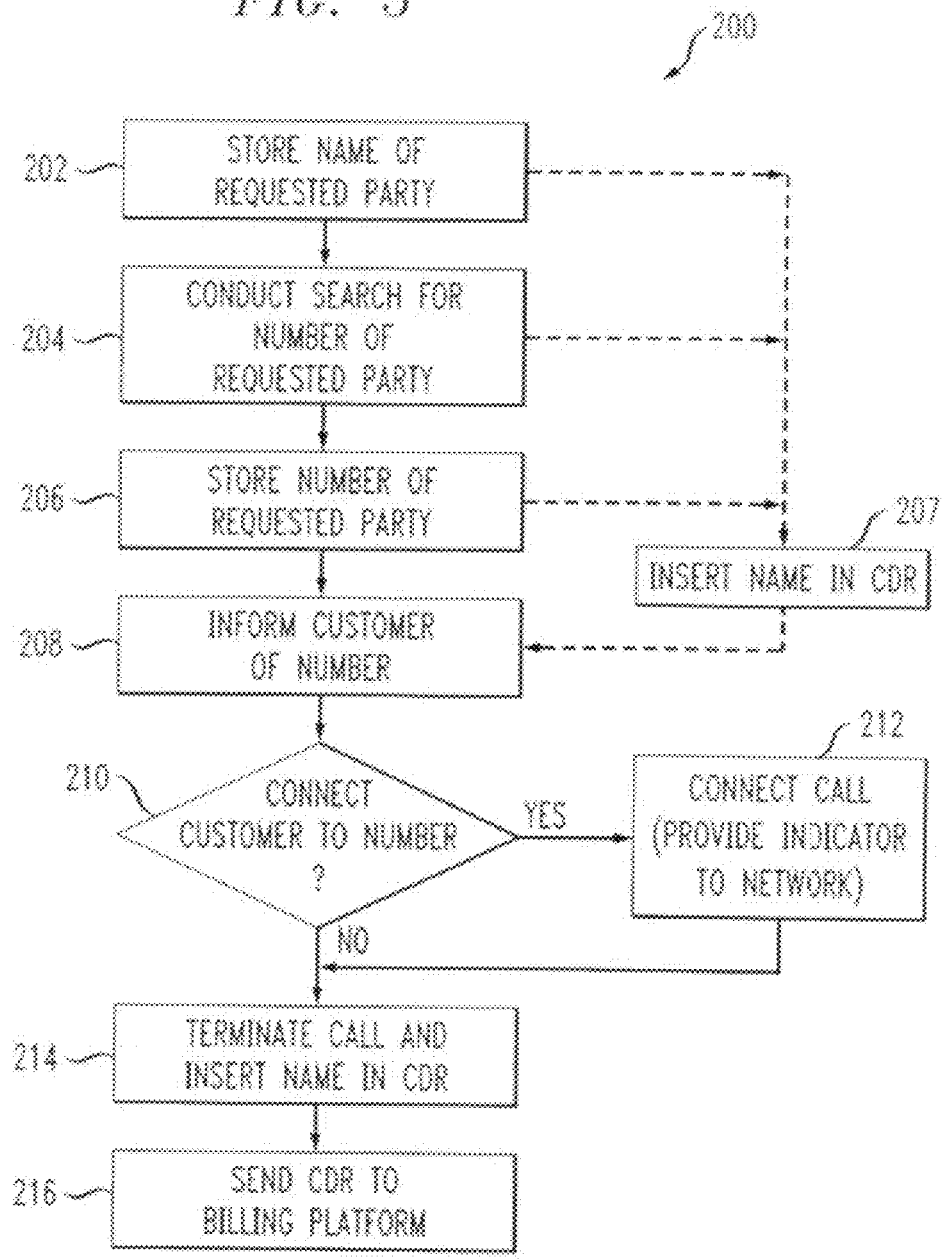
FIG. 5 is an example of a method for identifying a requested party in a call detail record, accordance with an embodiment of the present invention.

In another alternative, carrier switch 908 may be coupled to database server 120 though an interface 918, in a similar manner as carrier switch 504 is coupled to interface 512 in the embodiment of FIG. 5. In this case, the methods of FIGS. 6a and 6b may be implemented.

The communications systems described above may be implemented with in-band, feature group D (FGD) type signaling, SS7 out-of-band signaling or other signaling for communications between switches (including carrier switches). Where SS7 out-of-band signaling is used, the communications systems receive the call set-up signals and call progress information (busy, ring-no-answer, number unavailable, answer supervision, etc.) coining from an SS7 signaling link, separate from the voice trunk.

While information assistance service system 10 and IASC 100 are accessed via a telephone network in the embodiments described above, it is understood that system 10 and IASP 100 may be accessed via other types of networks, such as the Internet or a WAN. In the case of the Internet, the ANI may be replaced by a URL, using conventional networking and computer equipment.

The communications systems and their components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. In addition, while parties' names are stored in different memory devices associated with different components of the IASC 100, parties' names may be stored in different locations in the same memory device.

While the description above primarily refers to phones, such as wireline and wireless phones, aspects of the invention may be applicable to the use of other types of communications devices, as well.

The foregoing merely illustrates the principles of the invention. It will thus be appreciated that those skilled in the art will be able to devise numerous other arrangements that embody the principles of the invention and are thus within the spirit and scope of the invention, which is defined by the claims, below.

The invention claimed is:

1. A method of operating a communications system for providing a service, wherein a plurality of parties may be associated with members of an account with the system to receive the service, the method comprising:
   receiving a communication from one of a plurality of members of an account, the communication including a request for a service, wherein a common bill is provided for services rendered to the members of the account;
   receiving from the one party among the plurality of members an identifier to be used to identify the one party from among the plurality of members;
   providing the common bill for services rendered to the plurality of members of the account, to a communications device via a network; and
   providing in the common bill an indicator of the one party requesting the service, in association with a respective entry for the requested service.

2. The method of claim 1, wherein said communication from one of a plurality of members of an account is a telephone call, said method further comprising:
   identifying the one party based, at least in part, on a voiceprint of the one party received when the request was made and a voiceprint sample of the party stored by the system.

3. The method of claim 1, wherein the system is an information assistance service system, the method comprising:
   receiving a request for information assistance from the one party, with respect to a second party.

4. The method of claim 1, wherein the service is establishing a communications connection between a first communications device of the one party and a second communications device of a second party, the method comprising:
   receiving signals to establish a communications connection between the first communications device and the second communications device.

5. The method of claim 1, wherein the communications system provides the service with respect to a second party, the method further comprising:
   providing a second indicator of the second party in association with an entry in the bill for the requested service.

6. The method of claim 5, further comprising:
   providing an option to either elect or suppress provision of the second indicator.

7. The method of claim 1, wherein the communications device comprises a display for displaying the bill, the method further comprising:
   displaying the bill on the display device; and providing a party with an option of paying the bill, via an activation point on the displayed bill.

8. The method of claim 1, wherein the communications system provides service with respect to a second party, the method further comprising:

storing information related to the second party in a database.

9. The method of claim 8, wherein the information related to the second party is contact information and the system stores contact information related to contacts of the account in a contacts folder, the method further comprising:

storing the contact information related to the second party in the contacts folder.

10. The method of claim 9, wherein the system stores contact information related to the contacts of the one party in a respective contacts folder, the method comprising:

inserting contact information related to the second party in the respective contacts folder.

11. The method of claim 1, wherein the communications device comprises a display for displaying the bill and the network is the Internet, the method comprising:

providing the bill to the display via the Internet.

* * * * *